(12) United States Patent
Johnston et al.

(10) Patent No.: US 7,991,296 B1
(45) Date of Patent: Aug. 2, 2011

(54) METHOD AND APPARATUS FOR DATA FRAME SYNCHRONIZATION AND DELINEATION

(75) Inventors: Cesar A. Johnston, Sunnyvale, CA (US); John M. Chiang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 816 days.

(21) Appl. No.: 11/938,019

(22) Filed: Nov. 9, 2007

Related U.S. Application Data

(60) Provisional application No. 60/865,323, filed on Nov. 10, 2006.

(51) Int. Cl.
*H04B 10/00* (2006.01)
*H04J 14/00* (2006.01)
(52) U.S. Cl. .......................................... 398/154; 398/66
(58) Field of Classification Search .............. 398/25–27, 398/58, 66–68, 70–72, 74, 75, 154, 165, 398/63
See application file for complete search history.

(56) References Cited

U.S. PATENT DOCUMENTS

2004/0264974 A1* 12/2004 Sorenson ....................... 398/140
2009/0016714 A1* 1/2009 Soto et al. ....................... 398/20

OTHER PUBLICATIONS

ITU-T Telecommunication Standardization Sector of ITU—G.984. 4—Series G: Transmission Systems and Media, Digital Systems and Networks, Digital sections and digital line system—Optical line systems for local and access networks—Gigabit-capable Passive Optical Networks (G-PON): ONT management and control interface specification (2004).
ITU-T Telecommunication Standardization Sector of ITU—G.984.4 Amendment 1, Series G: Transmission Systems and Media, Digital Systems and Networks, Didgital sections and digital line system— Optical line systems for local and access networks—Gigabit-capable Passive Optical Networks (G-PON): ONT management and control interface specification (2005).
ITU-T Telecommunication Standardization Sector of ITU—G.984.4 Amendment 2—Series G: Transmission Systems and Media, Digital Systems and Networks, Digital sections and digital line system— Optical line systems for local and access networks—Gigabit-capable Passive Optical Networks (G-PON): ONT management and control interface specification (2006).

(Continued)

*Primary Examiner* — Dalzid Singh

(57) ABSTRACT

A circuit and method to synchronize with a data transmission having a plurality of data transmission frames each with a start boundary identified by a predetermined synchronization pattern, includes comparing sets of data within the data transmission to a predetermined synchronization pattern. A frame tracking signal is assigned to each one of the plurality of comparison results that indicates a match between a data pattern within one of the plurality of sets of data and the predetermined synchronization pattern, including matches that occur multiple times within a known duration of the data transmission frame duration. Based on each frame tracking signal assigned to a comparison result, the start boundary of the data transmission frames is searched. The start boundary may be search by monitoring successive occurrences of the predetermined synchronization pattern in the data transmission at intervals of the known data transmission frame duration for each data matching data pattern. If the predetermined synchronization pattern occurs successively in the data transmission, the associated data pattern is confirmed as the synchronization pattern in the data transmission, and synchronization with the data transmission is achieved.

10 Claims, 15 Drawing Sheets

OTHER PUBLICATIONS

ITU-T Telecommunication Standardization Sector of ITU G.984.3—Series G: Transmission Systems and Media, Digital Systems and Networks, Digital sections and digital line system—Optical line systems for local and access networks—Gigabit-capable Passive Optical Networks (G-PON): Transmission convergence layer specification (2004).

ITU-T Telecommunication Standardization Sector of ITU G.984.4, Series G: Transmission Systems and Media, Digital Systems and Networks, Digital sections and digital line system—Optical line systems for local and access networks, Gigabit-capable Passive Optical Networks (G-PON): ONT management and control interface specification (2004).

ITU-T Telecommunication Standardization Sector of ITU G.984.4 Amendment 1, Series G: Transmission Systems and Media, Digital Systems and Networks—Digital sections and digital line system—Optical line systems for local and access networks, Gigabit-capable Passive Optical Networks (G-PON): ONT management and control interface specification (2005).

ITU-T Telecommunication Standardization Sector of ITU G.984.4 Amendment 2, Series G: Transmission Systems and Media, Digital Systems and Networks—Digital sections and digital line system—Optical line systems for local and access networks, Gigabit-capable Passive Optical Networks (G-PON): ONT management and control interface specification (2006).

* cited by examiner

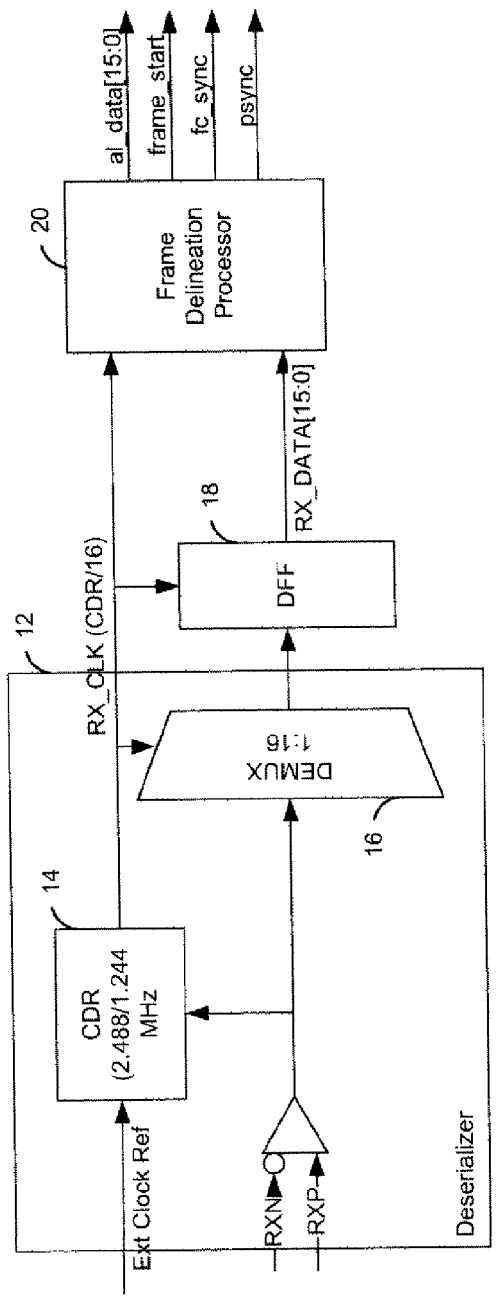
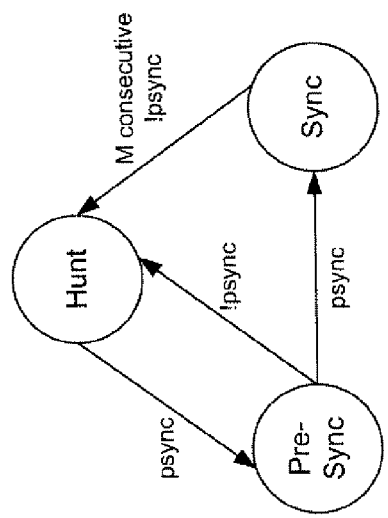
FIG. 1A
FIG. 1B

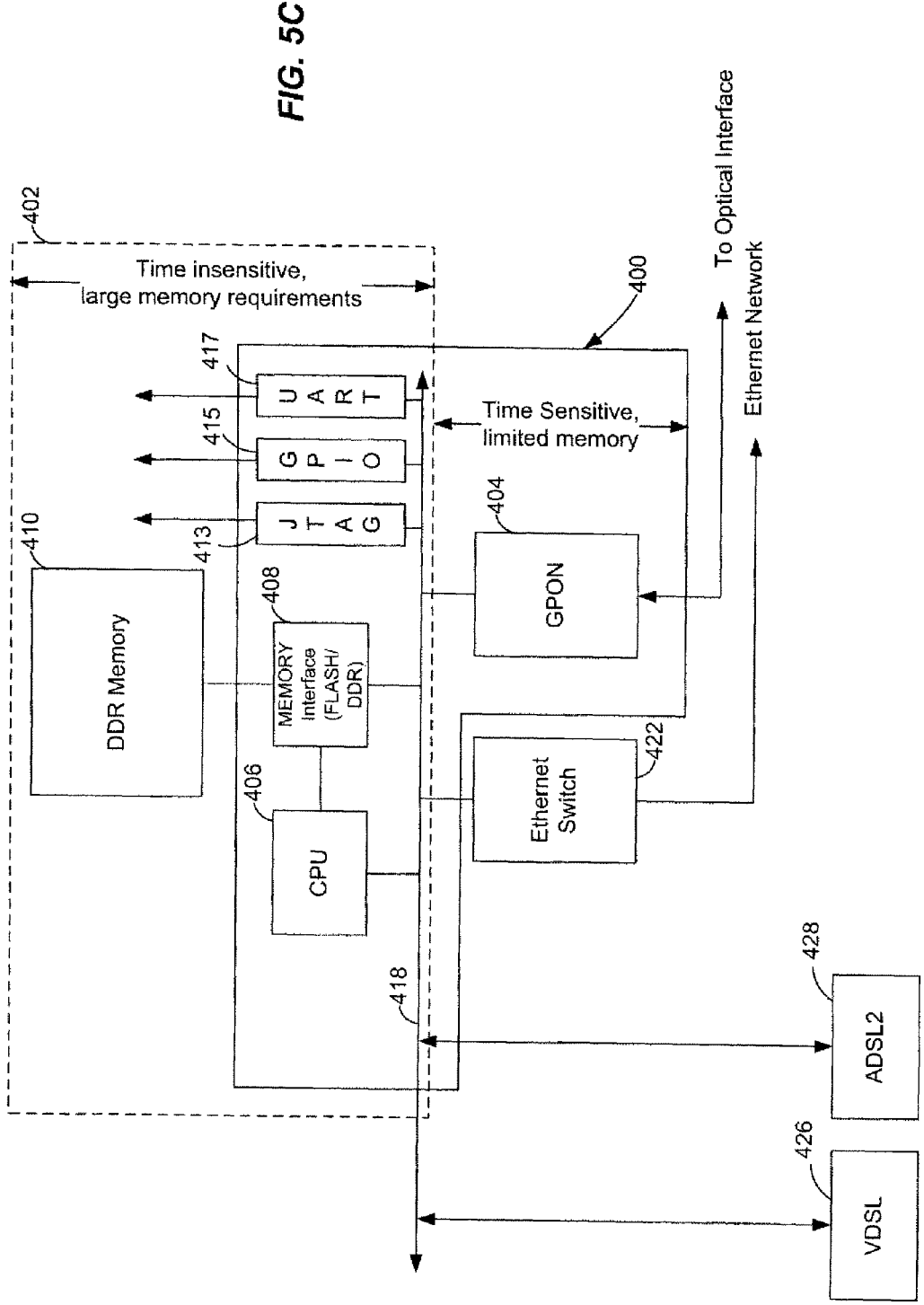

METHOD AND APPARATUS FOR DATA FRAME SYNCHRONIZATION AND DELINEATION

CROSS-REFERENCES TO RELATED APPLICATIONS

The present application claims the benefit of U.S. Provisional Application No. 60/865,323, entitled "GPON DOWNSTREAM RECEIVER FRAME SYNCHRONIZER SPECIFICATION," filed on Nov. 10, 2006, which is hereby incorporated by reference herein in its entirety.

FIELD OF TECHNOLOGY

The present disclosure relates generally to data frame synchronization, and more particularly, to downstream frame synchronization within a gigabit passive optical network.

DESCRIPTION OF THE RELATED ART

In point-to-multipoint networks, such as passive optical networks, the upstream and downstream transmissions are based on a transmission convergence frame format. The downstream frame includes a Physical Control Block downstream (PCBd) or overhead, and a payload which may include an asynchronous transfer mode (ATM) partition, and a gigabit passive optical network (GPON) encapsulation method (GEM) partition. The downstream frame provides the common time reference for the GPON, and provides the common control signaling for the upstream.

Optical network units (ONUs), and optical network terminations (ONTs), synchronize with the downstream frames by searching for a synchronization field in the PCBd within a GPON frame. In GPON, the synchronization field is provided as a PSYNC field having a fixed spatial pattern, which is generally provided as the first four frame bytes, and the ONT/ONU searches for the PSYNC field. For instance, FIG. 1 is a block diagram of an example deserializer and frame delineation processor for an ONT/ONU which is used to synchronize with the downstream frame data transmission. The deserializer 12 receives the downstream transmission, performs clock and data recovery using a CDR unit 14, demultiplexes the data using a demultiplexer 16 and provides the demultiplexed data (e.g., 16-bit data) to a delayed flip-flop 18. The demultiplexer 16 and the delayed flip-flop 18 are clocked according to the clock recovered by the CDR unit 14. A frame delineation processor 20, which may also be clocked according to the recovered clock, searches for the PSYNC field in the deserialized data transmission in order to identify the start boundary of the data transmission frames and delineate the incoming frames.

In particular, the frame delineation processor 20 searches the incoming deserialized data at the bit level to find PSYNC matching boundaries. The frame delineation processor 20 implements a frame synchronization process shown by the FSM (Finite State Machine) in FIG. 1B. Generally, the frame synchronization process begins in a hunt or search state, in which the frame delineation processor 20 searches for the PSYNC pattern in both bit and byte alignments. Once a correct PSYNC pattern is found (psync), the frame synchronization process transitions into the pre-synchronization state. The frame delineation processor then searches for another PSYNC pattern that follows the last one by the duration of the data transmission frames (e.g., 125 μs). If an incorrect PSYNC field is found (!psync), the frame synchronization process transitions back to the hunt state. In the pre-synchronization state, if a correct PSYNC field is found, the frame synchronization process transitions into a synchronization state. The number of PSYNC for the transition could be variable. Once the synchronization state is reached, the frame delineation processor can output a 'psync' signal to indicate the data transmission frames have been delineated and the ONT/ONU is in a synchronization with the data transmission. The frame delineation processor further outputs the deserialized aligned data (e.g., al_data[15:0]), and a frame_start signal indicating the start of the frame (e.g., all of the PSYNC pattern). The ONT/ONU may then begin to process the PCBd information. If a predetermined number (M) of consecutive incorrect PSYNC fields are detected while in the synchronization state, the ONT/ONU will have lost downstream frame alignment, and the frame synchronization process transitions back to the hunt state.

SUMMARY OF THE DISCLOSURE

In one embodiment, a circuit to synchronize with a data transmission in a passive optical network, wherein the data transmission includes a plurality of data transmission frames each having a known transmission duration and a start boundary identified by a predetermined synchronization pattern, comprises a comparator to read a plurality of sets of data within the data transmission, to compare each set of data to at least part of a predetermined synchronization pattern and to output a plurality of comparison results, wherein each set of data comprises a data pattern within the data transmission, a boundary aligner having an input operatively coupled to an output of the comparator to assign a frame tracking signal to each one of the plurality of comparison results that indicates a match between a data pattern within one of the plurality of sets of data and the predetermined synchronization pattern, and a frame tracker operatively coupled to an output of the boundary aligner to search for the start boundary of the data transmission frames based on each frame tracking signal assigned to a comparison result, and output a synchronization signal indicating a data pattern to select as the predetermined synchronization pattern, wherein the indicated data pattern is associated with the frame tracking signal for which a start boundary was found.

In another embodiment, a method of synchronizing with a data transmission in a passive optical network, wherein the data transmission includes a plurality of data transmission frames each having a known transmission duration and a start boundary identified by a predetermined synchronization pattern, comprises comparing a plurality of data patterns within the data transmission to at least part of a predetermined synchronization pattern, providing a comparison result for each comparison having a match between a data pattern and the at least part of the predetermined synchronization pattern to indicate a match between the data pattern and the predetermined synchronization pattern, assigning a frame tracking signal to each one of the plurality of comparison results occurring within the known transmission duration that indicates a match between a data pattern and the predetermined synchronization pattern, comparing one or more subsequent data patterns occurring in the data transmission to at least part of the predetermined synchronization pattern for each assigned frame tracking signal, wherein the one or more subsequent data patterns occur in intervals of the known transmission duration as measured from the data pattern corresponding to the frame tracking signal, and generating a synchronization signal associated with a selected one of the frame tracking signals, wherein the synchronization signal indicates a confirmed match between the data pattern corresponding to the selected frame tracking signal and the predetermined synchronization pattern based on the occurrence of the one or more subsequent data patterns matching at least part of the predetermined synchronization pattern for the selected frame tracking signal.

In still another embodiment, a method of synchronizing with a data transmission in a passive optical network, wherein the data transmission includes a plurality of data transmission frames each having a known transmission duration and a start boundary identified by a predetermined synchronization pattern, comprises receiving a comparison result for each comparison having a match between a data pattern within the data transmission and at least part of a predetermined synchronization pattern to indicate a match between the data pattern and the predetermined synchronization pattern, wherein each contemporaneous comparison result is received by a respective copy of synchronization detection logic, aligning a boundary of a data frame within the data transmission according to the comparison result if the comparison result indicates a match between the data pattern and the predetermined synchronization pattern, verifying the match between the data pattern and the predetermined synchronization pattern, and providing a matched synchronization signal to a synchronization state machine if the match between the data pattern and the predetermined synchronization pattern is verified.

BRIEF DESCRIPTION OF THE DRAWINGS

FIG. 1A is a block diagrams of an example of a deserializer and frame delineation processor for an optical network unit in a passive optical network;

FIG. 1B is a Finite State Machine of a frame synchronization process used by the frame delineation processor of FIG. 1A;

FIGS. 5B-5D are block diagrams of example architecture implementations of the integrated circuit configuration of FIG. 5A, and in the form of an optical line termination device, optical network termination device, and an optical network unit device, respectively;

DETAILED DESCRIPTION

Figure 2:
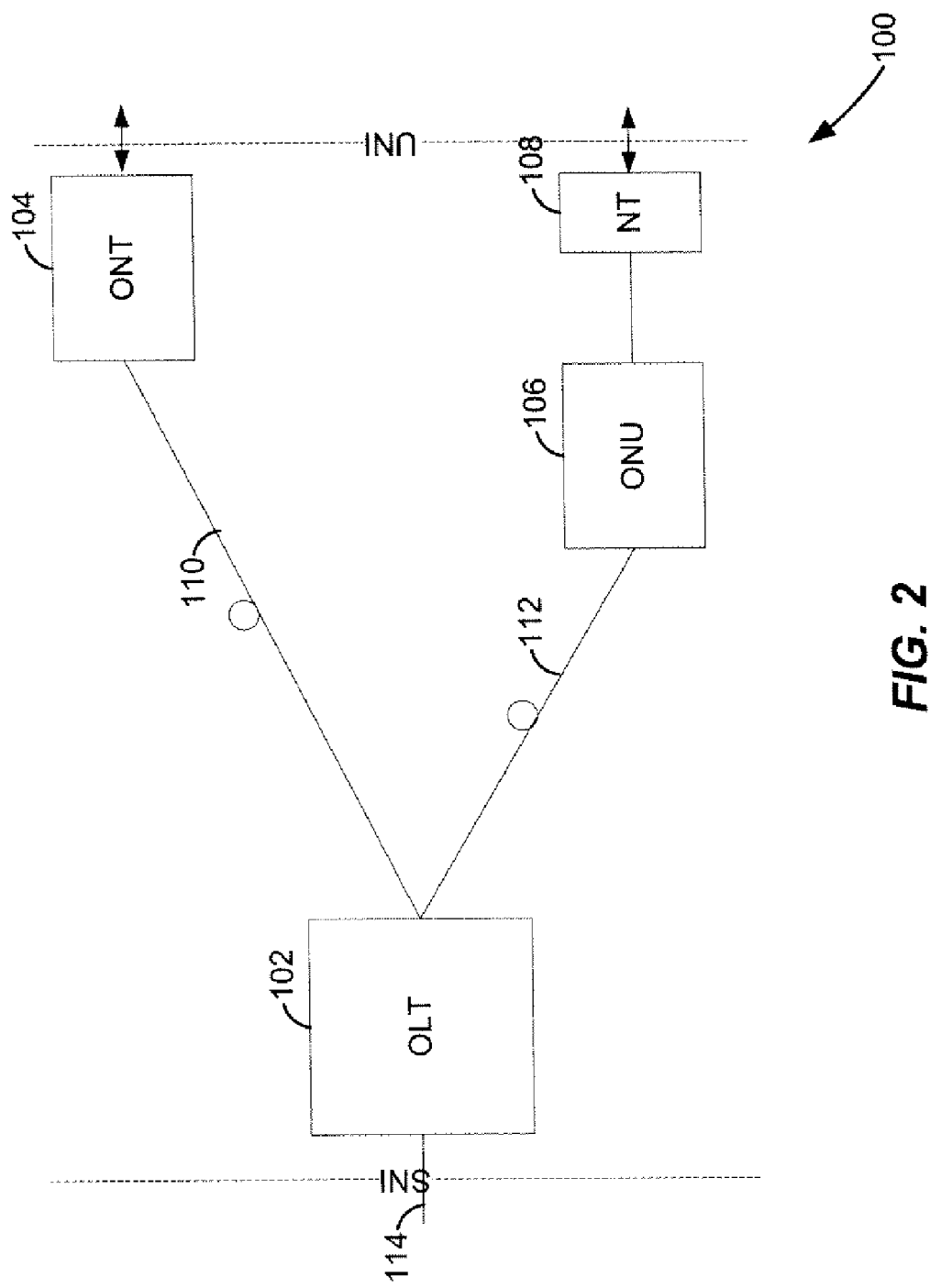
FIG. 2 is a block diagram of a passive optical network.

FIG. 2 is a block diagram of an example passive optical network 100 that includes an optical line termination (OLT) 102 coupled to an optical network terminal (ONT) 104 and an optical network unit (ONU) 106. Generally, the passive optical network 100 is a point-to-multipoint network, where the OLT 102 is provided as a service node interface, for example at a server or service provider, such as an internet service provider, television service provider, telephony service provider or other provider of network services. The ONT 104 and/or ONU 106 are each provided as a user node interface, for example at or near an end user. While the OLT 102 may be provided at the service provider site, the OLT 102 may also be provided as one of several OLTs within a distributed network, where each OLT is associated with corresponding ONUs 106 and/or ONTs 104.

As shown in FIG. 2, the OLT 102 is communicatively coupled to the ONT 104 via an optical fiber 110, and communicatively coupled to the ONU 106 via an optical fiber 112. The optical fibers 110, 112 may be part of an optical distribution network (ODN). Although only one ONT 104 and one ONU 106 are shown to be communicatively coupled to the OLT 102, it should be understood that in a point-to-multipoint optical network, optical fibers may be each be run, one-to-one from the OLT 102 to an ONT 104 and/or an ONU 106, where there may be multiple ONTs 104 and/or ONUs 106 in the passive optical network 100 each of which may, in turn, service multiple end users. As such, a single OLT 102 may service multiple end users on the same or a few optical fibers. As is understood, both the ONT 104 and the ONU 106 operate to terminate the passive optical network 100. An ONT 104 may refer to an integrated unit for an end user that presents the services of the service provider to the end user (e.g., video, data, telephony, etc.). An ONU 106 may be an optoelectronic interface to network termination (NT) equipment 108, where the ONU 106 terminates the passive optical network and the NT equipment 108 provides the services to the end user. The ONU 106 handles data packet conversion between the passive optical network 100 and the NT equipment 108, and the NT equipment 108 may provide an interface to the end user. While this disclosure references both ONTs 104 and ONUs 106, it should be understood that in the context of this disclosure, ONTs 104 and ONUs 106 may be treated similarly and these terms may be used interchangeably with optical network terminal generally referring to both ONTs 104 and ONUs 106.

Generally, the OLT 102 provides downstream broadcasts to each of the ONTs 104 and each of the ONUs 106 on different dedicated one-to-one fibers, where each ONT 104 and/or ONU 106 individually reads only the content of the transmissions intended for the particular ONT 104 and/or ONU 106. The ONTs 104 and the ONUs 106 provide upstream transmissions to the OLT 102 via their individual fibers in time division multiplexed (TDM) bursting mode. Communications between the OLT 102 and the ONT 104 or ONU 106 generally utilize wavelength division multiplexing with the downstream broadcasts utilizing one wavelength and upstream transmissions utilizing another wavelength. Although the passive optical network 100 is described as having one-to-one fibers between the OLT 102 and the ONTs/ONUs 104, 106, it should be understood that multiple fibers may be utilized in the one-to-one correspondence between the OLT 102 and each corresponding ONT/ONU 104, 106. In one example, each connection between the OLT 102 and the ONTs/ONUs 104, 106 may utilize two fibers, with one for upstream transmissions and one for downstream transmission, rather than wavelength division multiplexing signals that share the same fiber.

The OLT 102 provides a variety of functions within the passive optical network 100. At one level, the OLT 102 provides the interface 114 between the passive optical network 100 and a backbone network of the service provider network, which may include supporting time division multiplexed (TDM) protocols at different rates of speed, internet protocol (IP) traffic, asynchronous transfer mode (ATM) protocols, etc. The OLT 102 further facilitates both upstream and downstream communication between the service provider and the ONTs 104 and ONUs 106, and between ONTs 104 and ONUs 106. For example, the OLT 102 allocates upstream bandwidth to the ONTs 104 and ONUs 106 by granting intervals of time (e.g., time slot assignments) to each of the ONTs 104 and ONUs 106 to transmit upstream communications without collisions on the fiber. Upstream bandwidth allocation may be fixed for ONTs 104 or ONUs 106 requiring continuous (e.g., guaranteed) bandwidth availability. For ONTs 104 or ONUs 106 that do not require continuous bandwidth availability (e.g., burst transmissions), the OLT 102 may utilize dynamic bandwidth allocation (DBA) based on either polling bandwith information from the ONTs 104 and ONUs 106 or based on the occurrence of idle gigabit passive optical network (GPON) encapsulation method (GEM) frames from the ONTs 104 or ONUs 106. In addition, the ONTs 104 and ONUs are typically provided at different distances from the OLT 102, and the OLT 102 utilizes a ranging protocol to equalize the optical path length and equalize the transmission delay between the OLT 102 and the various ONTs 104 and ONUs 106. For example, the OLT 102 may measure the transmission delay for each ONT 104 and ONU 106, and transmits a physical layer operations and maintenance (PLOAM) message to set the transmission delay in the ONT 104 or ONU 106. The OLT 102 further provides centralized media access control (MAC) for the passive optical network 100 for purposes of upstream bandwith allocation, Upstream and downstream transmissions between the OLT 102 and the ONTs 104 or ONUs 106 may be performed in a transmission convergence frame format, whereby the transmission data, regardless of the services being provided, is encapsulated in the same type of data packet for transmission over the passive optical network 100. In particular, the transmissions between the OLT 102 and the ONTs 104 or ONUs 106 may take advantage of the gigabit passive optical network (GPON) standard developed by the International Telecommunications Union (ITU). The GPON standard is also known as ITU-T G.984. As is known, the GPON standard generally provides greater security as compared to previous standards, greater bandwidth, larger variable-width data packets, higher data rates and supports various Layer 2 protocols including ATM and GPON encapsulation method (GEM).

Although the disclosure generally refers to a gigabit passive optical network (GPON), it should be understood that all or part of this disclosure may be equally applicable to, or supportive of, previous-generation passive optical network standards, such as asynchronous transfer mode (ATM) passive optical network (APON) and broadband passive optical network (BPON), current passive optical network standards, such as Ethernet passive optical network (EPON), and future passive optical network standards, such as wavelength division multiplex passive optical network (WDM-PON). The disclosure may also be equally applicable to variations on the GPON standard.

Figure 3:
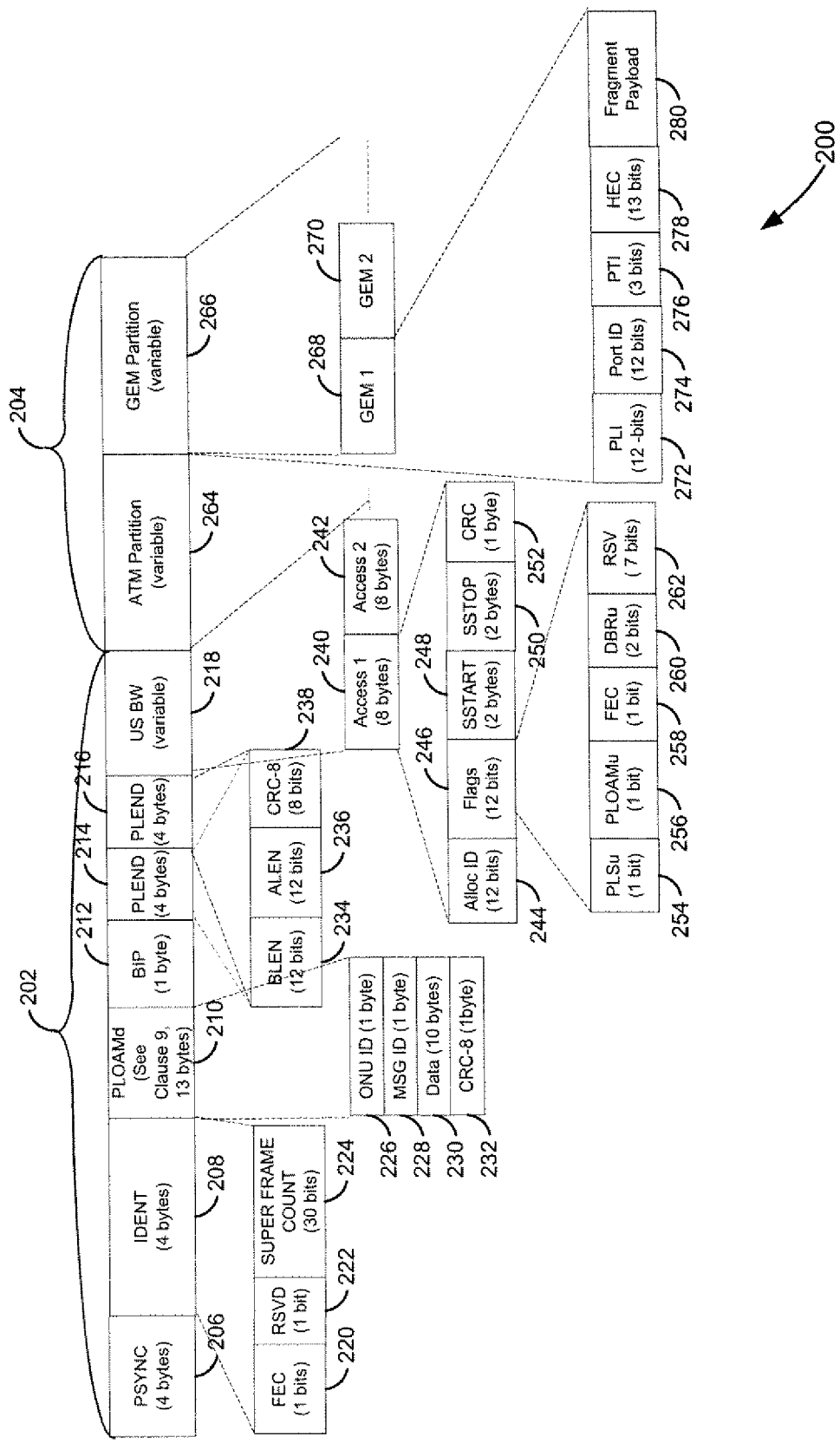
FIG. 3 is a diagram of a downstream gigabit passive optical network transmission convergence frame format.

FIG. 3 is an example of a downstream transmission convergence layer (TC-Layer) frame format 200 using the GPON standard and which may be utilized for downstream transmissions from the OLT 102 to the ONTs 104 and ONUs 106. The downstream frame format 200 generally includes an overhead field 202 and a payload field 204, where the overhead field 202 includes several sub-fields to be assembled by the OLT 102 and the payload field 204 includes the information being sent to the ONT 104 or ONU 106 (e.g., service data). As indicated above, the data for the payload field 204 may be provided in one or more transport formats, such as ATM or GEM, and as a variable length data packet. As also indicated above, while the following disclosure involves an example of the downstream transmission convergence layer (TC-Layer) frame format 200, as well as the subsequent upstream transmission convergence layer (TC-Layer) frame format discussed further below, it should be understood that variations of the downstream and upstream formats may occur and the disclosure is not limited to the particulars examples given herein. Generally, the downstream frame provides a common time reference for the passive optical network 100, and provide common control signaling for the upstream.

The overhead field 202 for the downstream transmission frame is generally broadcast by the OLT 102 to all ONTs/ONUs. Each ONT/ONU is then able to act upon relevant information contained in the overhead field 202. The overhead field 202 for the downstream transmission frame may be referred to as the physical control block downstream (PCBd), and may include a physical synchronization (PSYNC) field 206, an identification (Ident) field 208, a physical layer operations and maintenance downstream (PLOAMd) field 210, a bit interleaved parity (BIP) field 212, two payload length downstream (PLEND) fields 214, 216 and an upstream bandwidth map (US BWmap) field 218. The PSYNC field 206 is a fixed pattern that generally begins the overhead field 202, such that an ONT 104 or ONU 106 may use the PSYNC field 206 to identify the beginning of the frame 200 and establish synchronization with the downstream transmission. When the ONT 104 or ONU 106 finds the PSYNC field 206 within a frame of a downstream transmission from the OLT 102, the ONT/ONU 104, 106 may utilize a synchronization state machine, or other synchronization method, and search for other PSYNC fields 206 within subsequent frames to establish and monitor the synchronization state with the transmission. In one example, a counter may be set upon identifying a unique value in the PSYNC field 206, with the counter being incremented for each valid PSYNC field 206 read by the ONT/ONU 104, 106. Once the counter reaches a predetermined threshold of consecutive PSYNC fields, the ONT/ONU 104, 106 is able to enter into a synchronization state whereby the ONT/ONU 104, 106 is in synchronization with the downstream transmission rate. The ONT/ONU 104, 106 may thereby deter mine it has discovered the downstream frame structure and begin to process the overhead information. The ONT/ONU 104, 106 may also maintain a count for invalid or incorrect PSYNC fields 206, and if the incorrect count reaches a predetermined threshold of consecutive PSYNC fields, the ONT/ONU 104, 106 may determine that it has lost the downstream frame structure and repeat the search for a valid or correct PSYNC field 206. However, it should be understood that different state machines or different manners of establishing and monitoring synchronization with the transmission may be utilized.

Further discussion regarding searching for the PSYNC pattern and synchronizing with the downstream transmission is provided below. However, in one example of the GPON standard referenced above, the PSYNC field is a 32-bit spatial pattern used by the ONT/ONU logic to find the beginning of the frame. While the downstream frame may generally be scrambled using a frame-synchronous scrambling polynomial, the PYSNC pattern (e.g., 0Xb6ab31e0) typically remains unscrambled. The scrambling pattern is added modulo two to the downstream data, and a shift register used to calculate the polynomial is reset following the PSYNC field and runs until the last bit of the downstream transmission frame.

The Ident field 208 may be used to indicate large frame structures (superframes) within the downstream transmission frame, and which may be used to control data encryption. Generally, the Ident field 208 includes an FEC field 220, a reserved field 222 and a superframe counter 224. The FEC field 220 indicates whether forward error correction (FEC) is being is being enabled on the present downstream frame and may be used for FEC control. As is known, forward error correction is a method of error control for transmissions, where the OLT 102 may add redundant data to the downstream transmission frame, and the ONT/ONU 104, 106 may detect and correct errors using the redundant data, thereby avoiding retransmission of the downstream transmission frame from the OLT 102. The reserved field 222 is reserved for other purposes, and the superframe counter 224 provides error checking for potential dropped frames. The ONT/ONU 104, 106 loads the superframe counter value and compares its local expected value with the superframe counter value, whereby a match indicates correct synchronization and a mismatch indicates a transmission error or desynchronization.

The PLOAMd field 210 contains a downstream PLOAM message from the OLT 102 for the ONT/ONU 104, 106. A PLOAM message is generally a control message that may relate to a variety of information or instructions for the ONT/ONU 104, 106, including, but not limited to, alerts, activation-related messages, instructions, etc. For example, an Upstream_Overhead PLOAM message may instruct the ONT/ONU 104, 106 to use a particular preassigned equalization delay during ranging and number of preamble bytes for upstream transmissions, define the transmission power of the ONT/ONU 104, 106, A Scrial_number_mask PLOAM message may provide a serial number and a mask for part of the serial number. An Assign_ONU-ID PLOAM message may assign an identification with the serial number of the ONT/ONU 104, 106. A Ranging_Time PLOAM message may provide a value for an equalization delay register of the ONT/ONU 104, 106. A Deactivate ONU-ID PLOAM message may provide a deactivation/reset instruction to stop sending upstream transmissions. A Disable_serial_number PLOAM message may provide a disable/enable instruction to an ONT/ONU 104, 106. A Configure_VP/VC PLOAM message may activate or deactivate a virtual channel or a virtual path at the ATM layer. An Encrypted_Port-ID/VPI PLOAM message may indicate encrypted and unencrypted channels to the ONT/ONU 104, 106. A Request_password PLOAM message may request a password from the ONT/ONU 104, 106 for verification. An Assign_Alloc-ID PLOAM message may assign an allocation identification to an ONT/ONU 104, 106. A POPUP PLOAM message may instruct the ONT/ONU 104, 106 to move to a ranging state or an operation state. A Request_Key PLOAM message may trigger the ONT/ONU 104, 106 to generate a new encryption key. A Configure Port-ID PLOAM message may link a management and control interface of the ONT/ONU 104, 106 (OMCI) with a Port-ID which may be appended to an overhead of GEM encapsulated payload to be used as an addressing mechanism to route the OMCI over the GEM channel. A PEE-Physical Equipment Error PLOAM message to indicate that the OLT is unable to sent both ATM cells, GEM frames and ONT/ONU 104, 106 Management and Control Channel (OMCC). A Change-Power-Level PLOAM message may trigger the ONT/ONU 104, 106 to increase or decrease it transmission power level. A PST (PON Section Trace) PLOAM message may be provided to check the connectivity between the ONT/ONU 104, 106 and the OLT, and to perform Automatic Protective Switching (APS). A BER interval PLOAM message may be provided to define the accumulation interval per ONT/ONU 104, 106 expressed as a number of downstream frames for the ONT/ONU 104, 106 counting the number of downstream bit errors. A Key Switching Time PLOAM message may indicate when the ONT/ONU 104, 106 when to begin using a new encryption key.

As seen in FIG. 3, the PLOAMd field 210 is formatted to include an ONU ID 226, a Message-ID 228, the message Data 230 and a cyclic redundancy check (CRC) 232. The ONU ID 226 identifies the ONT/ONU 104, 106 to receive the PLOAM message. The Message-ID 228 identifies the type of PLOAM message, example of which are provided above. The message Data 230 are used for the payload of the PLOAM message. The CRC 232 is a frame check sequence, such that the PLOAM message may be discarded upon receipt if the CRC is incorrect.

The BIP field 212 contains the bit interleaved parity of the bytes that have been transmitted since the previous BIP. The ONT/ONU 104, 106 independently determined the BIP and compares the result to the BIP field 212 to measure the number of errors in the transmission.

The Plend field 214, 216 specifies the length of the bandwidth map (BWmap) (also referred to as the bandwidth allocation) and any ATM partition in the payload 204. The BWmap length is provided in a Blen field 234, and the ATM partition length related information is provided in a Alen field 236. As seen in FIG. 3, the Plend field 214, 216 is a redundant field for error robustness. The Plend field 214, 216 may be protected by CRC (e.g., CRC-8) for error detection and correction as provide in a CRC field 238. In particular, the length of the bandwidth map provides the limit of the number of allocation IDs that may be granted in any particular duration in any 125 microsecond duration up to 4095. The actual length of the BWmap field 218 is then 8 times the Blen value. The Alen field 236 may allow up to a particular number of ATM cells in a frame (e.g., a 12-bit Alen field allows 4095 ATM cells), up to a particular data rate (e.g., 10 Gbits/s). The length of the ATM partition is then 53 times Alen. The ONT/ONU 104, 106 implements the error detection and correcting functions of the CRC field 238, decodes both copies of the Plend field 214, 216, and uses the copy based upon the result of the CRC detection process (e.g., the copy that is error free or that has a correctible error).

The US BWmap field 218 provides an upstream bandwidth allocation as processed by the OLT acting as the main or central controller for the ONTs 104 and ONUs 106. The BWmap field is provided as an array of allocation structures 240, 242 (Access1, Access2, etc.), where each entry in the array represents a single bandwidth allocation to a particular transmission container (T-CON). The number of entries in the BW map is provided in the Plend field 214, 216. The access fields are distributed to the ONT/ONU 104, 106 which become slaves to the OLT and are required to follow the provided format.

As shown in FIG. 3, each allocation structure 240, 242 includes an Alloc ID field 244, a Flags field 246, a SSTART field 248, a SSTOP field 250 and a CRC field 252. The Alloc ID field 244 indicated the particular T-CONT that is being granted time on the upstream, and includes an address of the ONT/ONU 104, 106 receiving the T-CONT.

The Flags field 246 contains five separate indications on how the allocation should be used by the ONT/ONU 104, 106, including information to be sent back to the OLT during the bandwidth allocation provided to the ONT/ONU 104, 106. The Flags field 246 includes a PLSu field 254, a PLOAMu field 256, an FEC field 258, a DBRu field 260 and an RSV field 262. The PLSu field 254 is a power leveling sequence used for power control measurements by the ONT/ONU 104, 106 which, if set, directs the ONT/ONU 104, 106 to send its PLSu information during the bandwidth associated allocation. If the PLSu bit is not set, the ONT/ONU 104, 106 does not send its PLSu information for the associated bandwidth allocation. The power control measurements function allows for adjustment of the power levels of the ONT/ONU 104, 106 to reduce the optical dynamic range as seen by the OLT, and is useful in initial power set-up of the ONT/ONU 104, 106 (e.g., during activation), and power mode change of the ONT/ONU 104, 106 transmitter (e.g., during activation or operation). The PLOAMu field 256 directs the ONT/ONU 104, 106 to send its PLOAMu information during the associated bandwidth allocation, if the bit is set. Examples of the PLOAM messages are discussed above. The FEC field 258 causes the ONT/ONU 104, 106 to compute and insert an FEC parity during the associated bandwidth allocation, if the bit is set. The DBRu field 260 causes the ONT/ONU 104, 106 to send an upstream Dynamic Bandwidth Report indicating the number of cells or blocks in the T-CONT buffer of the ONT/ONU 104, 106, whereby the OLT may determine the congestion status of each T-CONT. The RSV field 262 is reserved for future use.

The SSTART field 248 is the start time field indicating the starting time for upstream transmission (i.e., the starting time of the bandwidth allocation). The SSTOP field 250 is the stop time field indication the stop time for the upstream transmission. Each ONT/ONU 104, 106 uses the SSTART and SSTOP fields 248, 250 to determine when to start and stop its upstream transmission. Each ONT/ONU 104, 106 identifies which particular information among the allocation structures is for its own use as filtered through the Allocation ID 244 bits within the access portion of the frame. The CRC field 252 is a cyclic redundancy check (e.g., CRC-8) that protects each allocation structure, where the ONT's/ONU's 104, 106 BWmap field 218 processing implements error detecting and correcting functions of the CRC. If an uncorrectable error occurs as indicated by the CRC function, the allocation structure is discarded.

The transmission convergence payload field 204 may include both an ATM payload field 264 or partition, and a GEM payload field 266 or partition. As such, a variety of user data type may be carried in the GPON transmission convergence payload. The ATM partition 264 may contain a number of ATM cells, the length of which is provided in the Plend/Alen fields 214/236, 216/236. The OLT 102 may allocate as many cell durations as needed in the downstream, including almost all of the downstream frame. Generally, the ATM partition 264 is an integer multiple of 53 bytes long based upon the Plend/Alen fields 214/236, 216/236, and the ATM cells are aligned to the partition. The downstream cell stream is filtered at the ONT/ONU 104, 106 based upon a virtual path identifier (VPI) or virtual channel identifier (VCI). In particular, each ONT/ONU 104, 106 is configured to recognize which VPI belongs to it, and ATM cells that belong to the ONT/ONU 104, 106 are passed on to the ATM client process.

The GEM partition 266 contains a variable number of GEM frame-mode delineated frames 268, 270 (GEM1, GEM2, etc.). The length of the GEM partition 266 is determined based on whatever remains after the overhead 202 and ATM partitions 264 are subtracted from the overall frame length. The GEM protocol provides delineation of the user data frame (either going to or coming from a user) and provides port identification for multiplexing. Delineation and port identification are accomplished by the GEM header discussed below. The delineation process uses the GEM header at the beginning of every downstream GEM partition and every upstream GEM payload. As such, in a downstream transmission the ONT/ONU 104, 106 is assured of finding the first header and may find subsequent headers using the payload length identifier (PLI) as a pointer.

As seen in FIG. 3, each GEM frame 268, 270 includes a header containing a PLI field 272, a Port-ID field 274, a PTI field 276, HEC field 278, and a fragment payload 280. The PLI field 272 indicates the length of the fragment payload 280 following the header, and is used to identify the next header in the GEM stream to provide delineation. The size of the PLI field 272 (e.g., 12-bits) determines the size of the GEM fragments (e.g., up to 4095 bytes), where data frames larger than the GEM fragment payload size are fragmented into smaller sizes to accommodate the GEM fragment payload size. The Port-ID field 274 is a unique traffic identifier on the passive optical network 100 to provide traffic multiplexing. The PTI field 276 indicates the content type of the fragment payload 280 and how the fragment payload 280 should be treated (e.g., user data fragment; congestion has or has not occurred; end or not end of a frame). The PTI field 276 may be similar to that used in the ATM header. The PTI field 276 indicates which fragment contains the end of the user data frame. The downstream frame transmission is filtered at the ONT/ONU 104, 106 based upon the Port-ID field 274 contained in each GEM fragment. Frames belonging to the ONT/ONU 104, 106, each of which are configured to recognize which Port-IDs belong to it, are passed on to the GEM client process.

The HEC field 278 is header error control which provides error detection and correction functions for the GEM header. The GEM header may be provided at the beginning of each downstream GEM payload and the ONT/ONU 104, 106 uses the PLI field 272 to find the first header, and finds subsequent headers using the PLI as a pointer. The ONT/ONU 104, 106 may thereby transition to the "sync" state at the beginning of each partition and payload. If uncorrectable errors occur in the header as determined based on the HEC field 278, delineation of the GEM partition may lose synchronization with the data stream, and the ONT/ONU 104, 106 attempts to reacquire synchronization. The ONT/ONU 104, 106 searches for a GEM header HEC field 278, and when one is found, the ONT/ONU 104, 106 transitions to a pre-synchronized state, where it looks for the HEC field 278 at the location indicated in the previously found header. If the HEC matches, then the transition is made to the synchronized state. If it does not match, then the transition is made to the search for another HEC.

Figure 4:
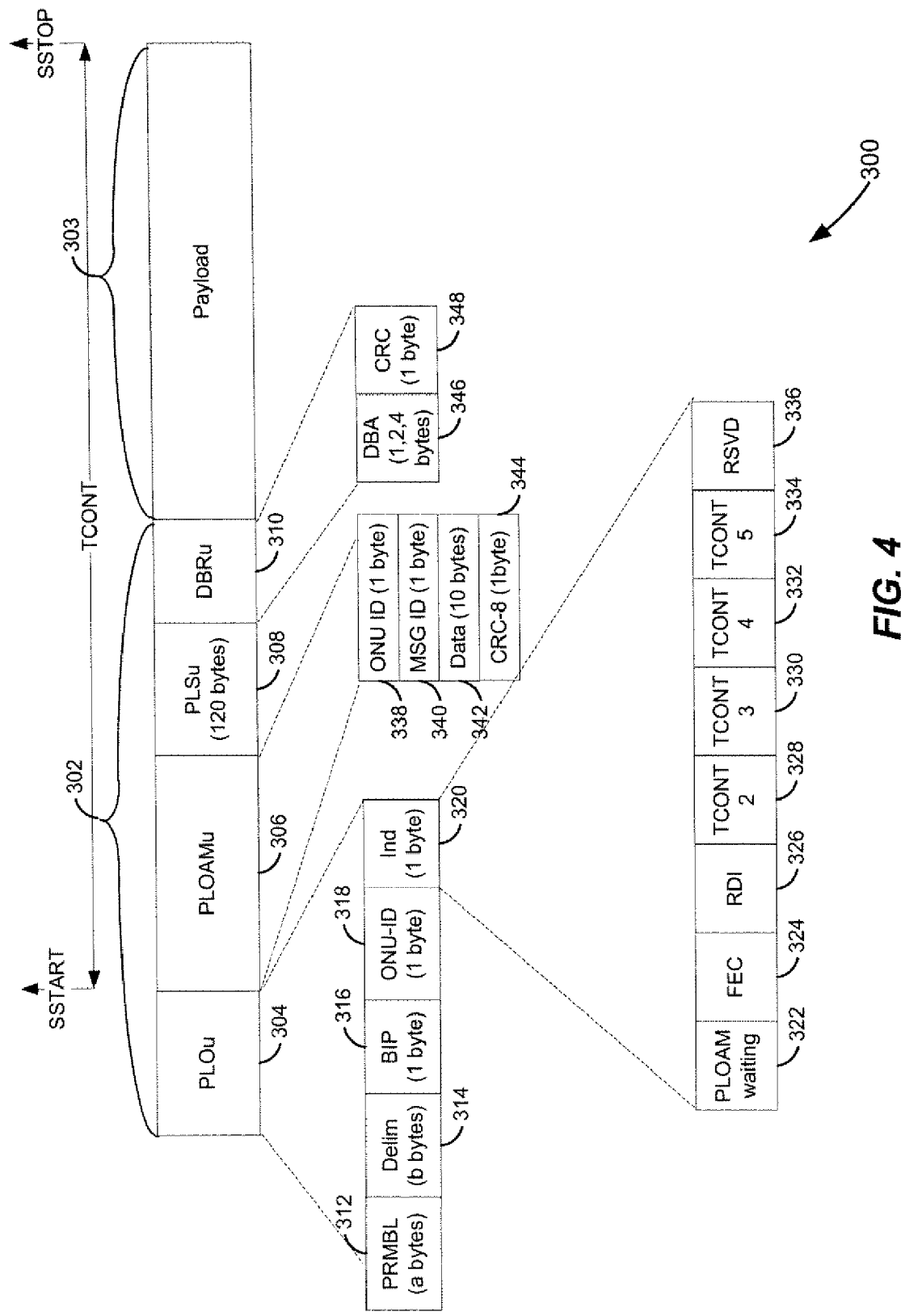
FIG. 4 is a diagram of an upstream gigabit passive optical network transmission convergence frame format.

FIG. 4 is an example of an upstream transmission convergence layer (TC-Layer) frame format 300 using the GPON standard and which may be utilized for upstream transmissions from the ONTs 104 and/or ONUs 106 to the OLT 102. The upstream frame format 300 generally includes an overhead field 302 and a payload field 303. The overhead field 302 includes several sub-fields to be assembled by the ONT/ONU 104, 106 and processed by the OLT 102 and the payload field 303 includes the information being sent to the OLT 102 or to the service provider network. As indicated above, the data for the payload field 303 may be provided in one or more transport formats, such as ATM or GEM, and as a variable length data packet. The frame length of the upstream transmission convergence layer (TC-Layer) frame format 300 may be the same as that of the downstream transmission convergence layer (TC-Layer) frame format 200 for all transmission rates. Each frame may contain a number of transmissions from one or more ONT/ONU 104, 106, where the BWmap defines the arrangement of the transmissions. As seen in FIG. 4, the T-CONT of the upstream message is defined by the start and stop transmission times (SSTART and SSTOP) as determined by the OLT 102 during the downstream transmission, but does not include the PLOu field which is sent immediately prior to the start time pointer SSTART.

The overhead field 302 for the upstream transmission frame may include various types of overheads, including physical layer overhead (PLOu) 304, physical layer operations and management upstream (PLOAMu) 306, power leveling sequence upstream (PLSu) 308 and dynamic bandwidth report upstream (DBRu) 310. As discussed above, the Flag field 246 in the downstream transmission assembled by the OLT 102 indicates whether PLOAMu, PLSu or DBRu information should be sent from the ONT/ONU 104, 106 on each bandwidth allocation. The upstream frame is generally scrambled, and may be scrambled using a frame-synchronous scrambling polynomial.

The PLOu field 304 includes the physical layer overhead, which is provided as a preamble (PRMBL) field 312 and a delimiter (Dam) field 314. Three additional fields of data corresponding to the ONT/ONU 104, 106 as a whole are also provided: a bit interleaved parity (BIP) field 316, a ONT/ONU 104, 106 identification (ONU-ID) field 318 and an indication (Ind) field 320. The above data is generally provided at the beginning on any transmission burst from an ONT/ONU 104, 106. The status of the PLOu information is given by the arrangement of the bandwidth allocations. Every time an ONT/ONU 104, 106 takes over the passive optical network 100 from another ONT/ONU 104, 106, the ONT/ONU 104, 106 sends a new copy of the PLOu data. The GPON transmission convergence layer sources the PLOu 304. The preamble field 312 is used to synchronize the OLT 102 to the incoming message, and the delimiter field 314 is used by the OLT 102 to identify where the first bit of information in the frame begins. The preamble field 312 and the delimiter field 314 are formed as determined by the OLT in the Upstream_Overhead PLOAM message discussed above. As seen in FIG. 4, the preamble and delimiter fields 312, 314 are transmitted before the allocation start time SSTART pointer, as previously dictated by the OLT.

The BIP field 316 contains the bit interleaved parity of the bytes transmitted since the last BIP from the transmitting ONT/ONU 104, 106, excluding those of the preamble and delimiter fields 312, 314. The OLT 102 computes the bit-interleaved parity for each ONT/ONU 104, 106 burst, and compares the result to the BIP of the BIP field 316 to measure the number of errors in the link. The ONU-ID field 318 contain the unique identification of the transmitting ONT/ONU 104, 106. The ONU-ID is generally assigned to the ONT/ONU 104, 106 during the ranging process.

The Ind field 320 provide a real-time ONT/ONU 104, 106 status report to the OLT. As shown in FIG. 4, the format of the Ind field 320 is provided as a PLOAM waiting field 322 indicating if one or more PLOAM messages are waiting, an FEC field 324 indicating if forward error correction is enabled or not, a remote defect indication (RDI) field 326 indicating if a defect occurred or not, traffic waiting indicator fields for type 2 T-CONTs 328, type 3 T-CONTs 330, type 4 T-CONTs 332 and type 5 T-CONTs 334, as well as reserved bits 336. If the PLOAM waiting field 322 indicated an urgent PLOAM message is waiting, the OLT 102 may issue an upstream allocation that allows the ONT/ONU 104, 106 to send the PLOAM message in a timely manner. Further uses of the Ind field 320, and in particular the T-CONT fields 328, 330, 332, 334, are discussed below in relation to the DBRu field 310.

Examples of the PLOAM messages as provided in the PLOAMu field 306 are discussed above, and may be provided by the transmitting ONT/ONU 104, 106 in response to a corresponding request from the OLT 102. In particular, the PLOAMu field 306 may only be sent when indicated by the Flags field 246. The PLOAMu field 306 may have a similar structure as the PLOAMd field 210, including an ONU ID 338 of the transmitting ONT/ONU 104, 106, a Message-ID 340 identifying the type of PLOAM message, the message Data 342 for the payload of the message, and a cyclic redundancy check (CRC) 344 to detect and correct errors in the header fields 338, 340, 342.

The PLSu field 308 is used for power control measurements by the ONT/ONU 104, 106 and adjusts the ONT/ONU 104, 106 power levels to reduce the optical dynamic range seen by the OLT. The content of the PLSu field 308 is generally set by the ONT/ONU 104, 106, and is sent by the ONT/ONU 104, 106 when indicated in the Flags field 246 of a downstream transmission from the OLT 102. For example, the OLT 102 may set the PLSu bit on broadcast allocation to allow the ONT/ONU 104, 106 to set up its transmitter during the activation process. If the ONT/ONU 104, 106 does not use the PLSu field 308, the ONT/ONU 104, 106 may deactivate its transmitter for that time. During operation of the ONT/ONU 104, 106, the ONT/ONU 104, 106 generally transmits following the PLSu field 308 such that the ONT/ONU 104, 106 sends the PLSu field 308 when it is requested by the OLT regardless of any need to perform transmitter adjustment.

The DBRu field 310 includes information that is associated with the T-CONT entity, rather than the ONT/ONU 104, 106. The DBRu field 310 is sent when requested by the OLT in the Flags field 246 of a downstream transmission. The DBRu field 310 includes a dynamic bandwidth allocation (DBA) field 346 and a CRC field 348. The DBA field 346 contains the traffic status of the particular T-CONT, and may be used by the OLT 102 for bandwidth allocation for the ONT/ONU 104, 106. The DBA field 346 may be supported via status reporting and OLT traffic, monitoring for those ONT/ONU 104, 106 that do not report status. Status reporting DBA field 346 may be provided as status indications in the PLOu, in the DBRu as shown in FIG. 4, or in an ONU report in a DBA payload.

Status indications may be carried as four bits in the PLOu Ind field 320, and provide a report for each type of T-CONT 328, 330, 332, 334. Each bit may correspond to a different T-CONT type. If a bit is set for a particular T-CONT type 328, 330, 332, 334, the OLT 102 may assume there is some data waiting in one of the T-CONT buffers of that type. It is noted that T-CONT types 2, 3 and 4 328, 330, 332 may not have a fixed bandwidth component and any data waiting in those T-CONTs 328, 330, 332 causes the corresponding indicator to be set, whereas a T-CONT type 5 field 334 buffer may contain data belonging to a fixed bandwidth such that the presence of non-fixed bandwidth sets the corresponding indicator. The status indications provide an early warning to the OLT 102 that data is waiting, though it is not required that the OLT 102 DBA algorithm wait for such indications before allocating bandwidth to the ONT/ONU 104, 106 in order to avoid unnecessary delays. The OLT 102 may use the status indications for a fast alert that DBA supervision may be needed at the ONT/ONU 104, 106 without identifying the T-CONT 328, 330, 332, 334 or bandwidth detail.

Status reporting DBA in the DBRu field 310, shown in. FIG. 4 as the DBA field 346, provides a continuous update of the traffic status of a particular T-CONT and is carried in the DBRu field 310 associated with the T-CONT. The status report in the DBA field 346 specifies the amount of data waiting in the T-CONT buffer corresponding to the allocation identification (Alloc-ID) that triggered the DBRu transmission. The OLT 102 may trigger the transmission of the DBRu by setting the DBRu field 260 in the Flags field 246 of a downstream transmission. The CRC field 348 protects the report in the DBA field 346 and DBRu structure with error correction and detection. The OLT may implement the error detecting and correcting functions associated with the CRC field 348 (e.g., CRC-8). If the CRC function indicates an uncorrectable error, the information in the DBRu field 310 may be discarded.

An ONU report in a DBA payload allows for the ONT/ONU 104, 106 to send a DBA report on any T-CONT in the transmission, and is carried in a dedicated DBA payload partition allocated by the OLT in the upstream. The ONT/ONU 104, 106 may select the T-CONT that is the subject of the report, and allows the OLT 102 to schedule a DBA payload which is generally smaller that that required to report on all the T-CONTs in the ONT/ONU 104, 106.

The upstream payload field 303 may be used to carry ATM cells, GEM-delineated frames or DBA reports. The ATM upstream payload includes a number of ATM cells from the ONT/ONU 104, 106 to the OLT 102, and the length of the payload is given by the duration of the allocation minus the size of any requested overhead. The ONT/ONU 104, 106 may buffer the ATM cells as they are provided by the OLT 102 and send them in burst during the allocated time. The OLT 102 receives the ATM cells, and may multiplex them with other bursts from other ONT/ONU 104, 106 and pass them to the OLT ATM client. The GEM payload contains any number of GEM frame-mode delineated frames, and the length of the payload is also given by the duration of the allocation minus the size of any requested overhead. The GEM protocol provides delineation of the user data frame (either going to or coming from a user) and provides port identification for multiplexing. As discussed above, delineation and port identification are accomplished by a GEM header, where the delineation process uses the GEM header at the beginning of every upstream GEM payload. As such, in an upstream transmission the OLT 102 is assured of finding the first header and may find subsequent headers using the PLI as a pointer. The DBA payload is discussed above, and contains a group of dynamic bandwidth allocation reports from the ONT/ONU 104, 106.

Figure 5A:
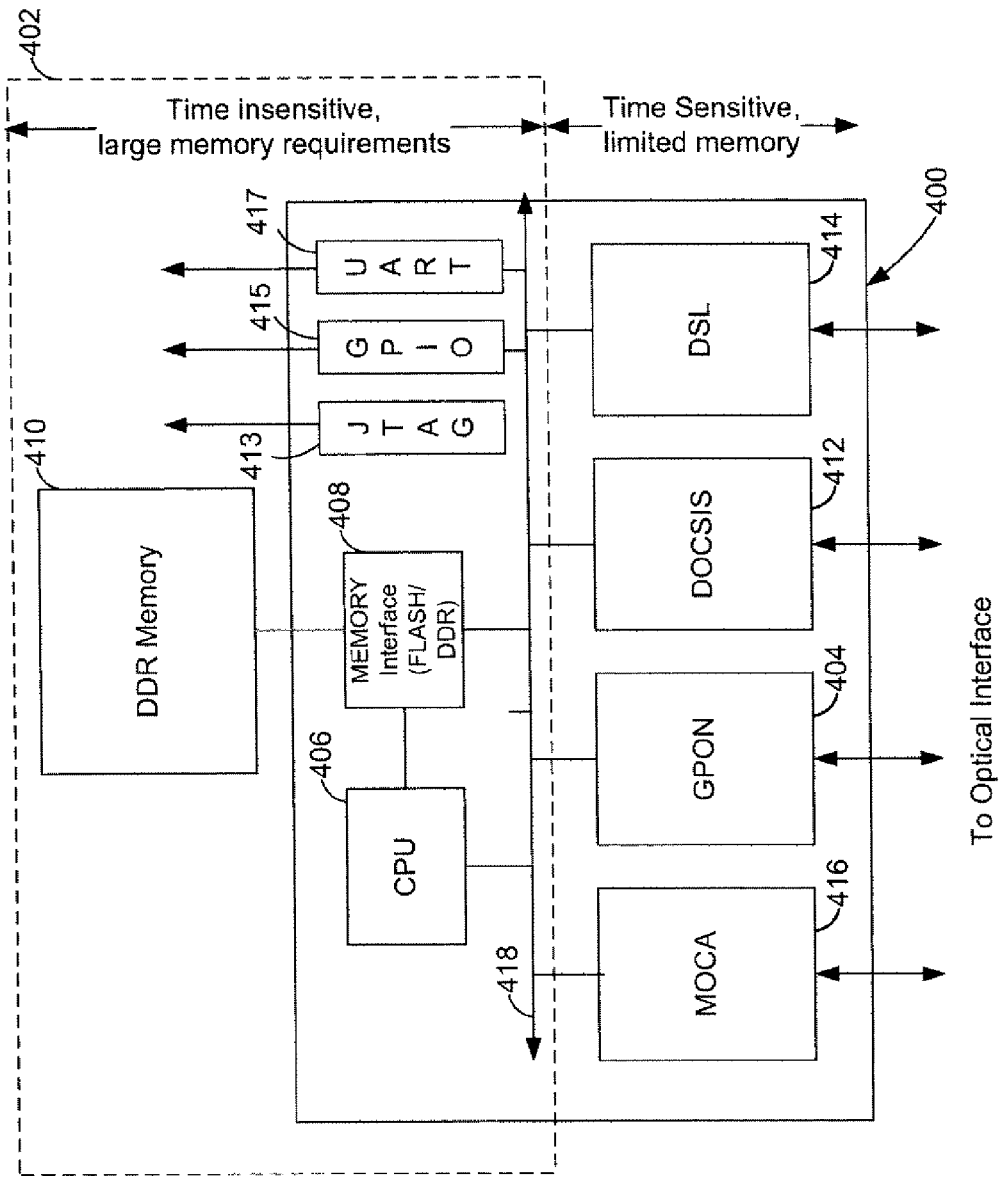
FIG. 5A is a block diagram of an example architecture of an integrated circuit within a passive optical network line termination unit.

FIG. 5A is a block diagram indicating an example of a general architecture 400 that may be implemented in the OLT 102 or the ONT/ONU to divide and execute time sensitive functions (low latency) from non-time sensitive functions. Generally, the architecture 400 includes a sub-system 402 which may be used to execute non-time sensitive functions, such as those that require large memory requirements or low latency, and integrated circuits 404 having an embedded processor for performing time-sensitive functions, such as those that may only need limited memory. Time-sensitive versus non-time sensitive functions may be determined based on time threshold or response threshold requirements for processing the functions. For example, some functions, such as Media Access Control (MAC), may require immediate response (i.e., fast response threshold, time sensitive), whereas other functions, such as TCP/IP routing or packet processing, may not require an immediate response (i.e., non-time sensitive). It is recognized that in practice the actual response time for some non-time sensitive functions may be comparable to the response time threshold of time-sensitive functions. However, it should be understood that it is the response time requirements (e.g., time threshold requirements) that establish whether a function is time-sensitive or not, rather than the actual response time seen in practice. As such, the time threshold requirements delineating between time-sensitive and non-time sensitive are not necessarily predetermined or static, but are rather based on the allowable response time for executing the function.

As will be apparent from the discussions below in regards to FIG. 6, the integrated circuit 404 may perform a variety of time-sensitive functions depending on the information received at a receiver end of the circuit 404 and the information to be transmitted from a transmitter end thereof. In a GPON context, for example, these functions may include processing of various subfields in overhead data in a received transmission. The integrated circuit may pre-process these subfields prior to offloading payload information to the subassembly 402. The integrated circuit 404 may identify the corresponding incoming upstream transmission for the OLT and the location, length and value of the various subfields contained in the overhead field. On the transmitter side, the integrated circuit 404 may create the transmitted data overheads based on information from the receiver side as well as information (such as payload information) from the subassembly 402. In fact, one aspect of the architecture 400 is that in some examples information obtained from processing the received data may be used to directly control processing of transmitter data without resorting to offloading all such data retrieval and reconstruction to the subassembly 402. In this way, internal delays in a processing unit of a PON (e.g., an OLT) may be reduced. Further, because clock data recovery may be performed within the integrated circuit 404 and communicated directly with the transmitter within the integrated circuit 404, the architecture 400 may be used to more accurately correct for internal delays.

The subassembly 402 may be provided as part of a systems-on-a-chip (SoC) which may be re-usable for a variety of different implementations, including implementation of different integrated circuits as discussed below. As such, the subassembly 402 provides a "snap-and-run" architecture in which a variety of chips may be coupled to the subassembly 402, and the subassembly 402 is not limited to OLTs 102, ONTs 104 or ONUs 106, much less the example provided herein. The subassembly 402 may therefore be used to reduce the time-to-market chip assembly, as it can be used among a variety of chip designs and to build different chips.

Generally, the subassembly 402 includes an SoC processor 406 for processing the non-time sensitive functions and a memory interface 408 coupled to the SoC processor 406. A memory 410 is further provided and coupled to the memory interface 408 for buffering data from the integrated circuits 404 (e.g., packet buffering) and may include embedded memory management. The memory 410 thereby stores data for execution of non-time sensitive functions to be processed by the SoC processor 406. The SoC processor 406 controls the memory 410 and movement of data packets in and out of the memory 410 as needed.

The SoC processor 406 and the memory 410 are provided external to the integrated circuit 404 to support the processing of non-time sensitive functions while the processing of time-sensitive functions is handled by the integrated circuit 404. Accordingly, the SoC processor 406 and memory 410 may be used to minimize the amount of processing required at the chip level (e.g., packet level). That is, non-time sensitive functions that require additional processing complexity may be passed from the integrated circuits 404 to the subassembly

402. Different types of memories may be used for the memory 410, including double data rate (DDR) memory, flash memory, etc. The memory interface 408 may be provided as an interface corresponding to the memory 410 (e.g., a DDR memory interface, flash memory interface, etc.). The subassembly 402 may further include additional components, such as a debugging port (e.g., a joint task action group (JTAG) port 413), an input/output interface (e.g., a general purpose input/output (GPIO) 415), a receiver and/or transmitter (e.g., a universal asynchronous receiver/transmitter (UART) 417), or other peripheral interfaces in different SoC embodiments. The devices 413, 415, 417, the memory 408 and the processor 406 are all coupled to a backplane bus 418 of the SoC subassembly 402.

As shown in FIG. 5A, the integrated circuit 404 may be a GPON chip 404 coupled to the subassembly 402, thus forming an SoC. The integrated circuit 404, which may be a GPON chip 404, communicates with the SoC subassembly 402 through an interface coupled to the backplane bus 418. Further disclosure of the GPON chip 404 is provided by way of example below. Generally, the GPON chip 404 includes an internal processor, and an SoC interface to the SoC subassembly 402 which interfaces with the SoC processor 406 and with the memory 410 via the memory interface 408. It should be understood that while the architecture 400 is described with reference to particular components, integrated circuits and particular transmission standards, the architecture 400 may be readily applied to different components and standards where time-sensitive and non-time sensitive functions may be applicable, including, but not limited to, wireless and wireline technologies.

While the architecture 400 may include only a passive optical network communicatively coupled to the SoC subassembly 402, the SoC subassembly 402 may be coupled to other types of networks or layers. For example, although the architecture 400 is shown to include a GPON 404 chip which interfaces with the passive optical network 100, it should be understood that different integrated circuits may be utilized in the architecture 400. As seen in FIG. 5A, additional or alternative technologies, such as Data Over Cable Service Interface Specifications (DOCSIS) 412, Digital Subscriber Line (DSL) 414 or Multimedia over Coax Alliance (MOCA) 416 may be implemented and interfaced with wireline networks.

As further examples, the architecture may further include an Ethernet switch interface circuit coupled to an Ethernet switch for monitoring and redundancy, a system packet interface layer 3 (SPI-3) circuit, a synchronous optical network, etc. Other layers may also be supported by the architecture. Although the above examples have been described with reference to various wireline technologies, it should be understood that various wireless technologies may be utilized with wireless integrated circuits utilized in the architecture 400, such wireless technologies including, but not limited to, the Institute of Electrical and Electronics Engineers wireless local area network IEEE 802.11 standard, Worldwide Interoperability for Microwave Access (WiMAX), Ultra-wideband (UWB) radio technology, and cellular technology. Generally, whenever a division of the time sensitive versus non-time sensitive functions is desired, each integrated circuit included in the architecture 400 may include an internal processor for execution of the time sensitive functions and an SoC interface to forward data packets for non-time sensitive functions to the sub-assembly 402 for execution therein.

Figure 5B:
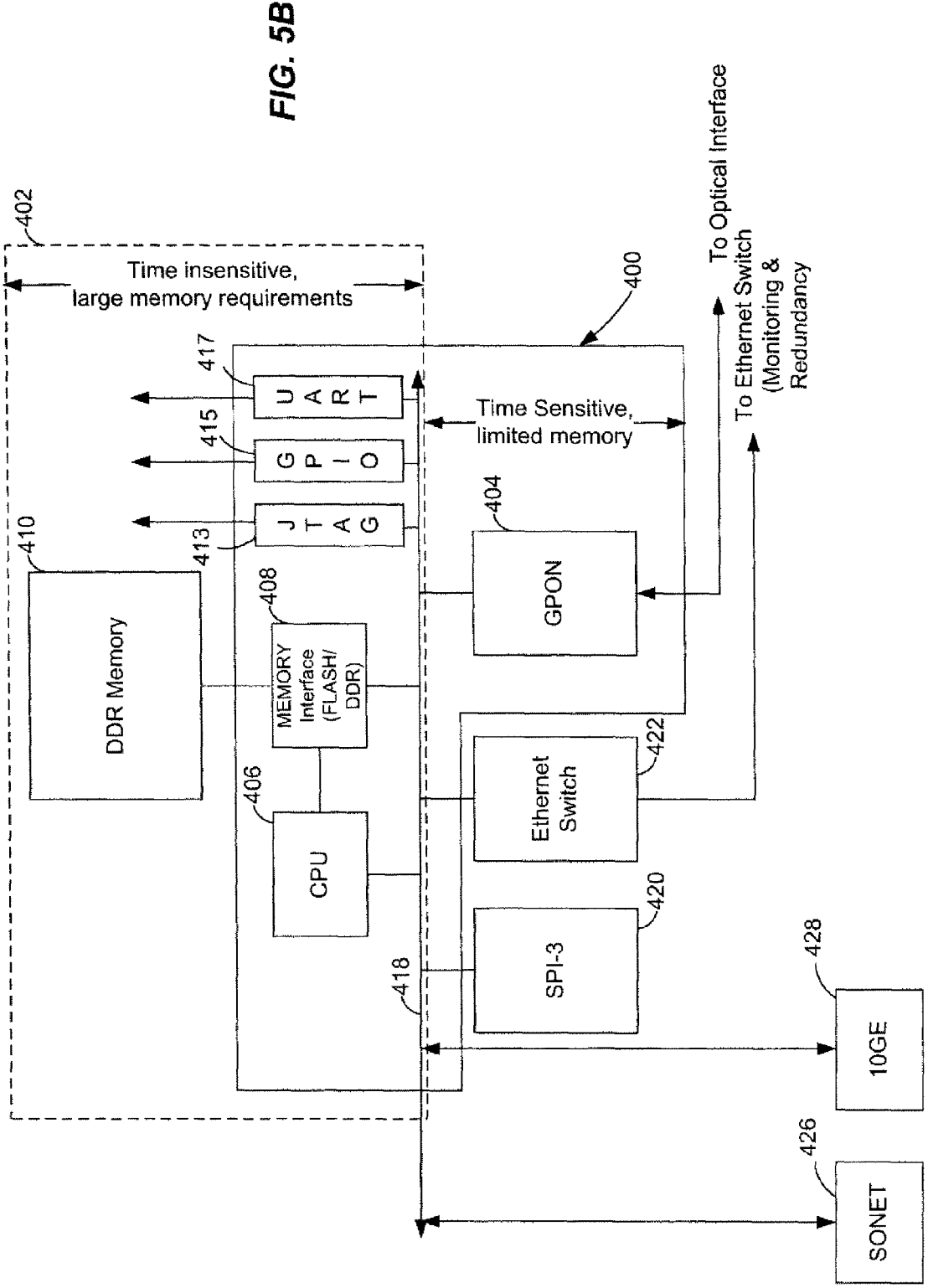
Figure 5D:
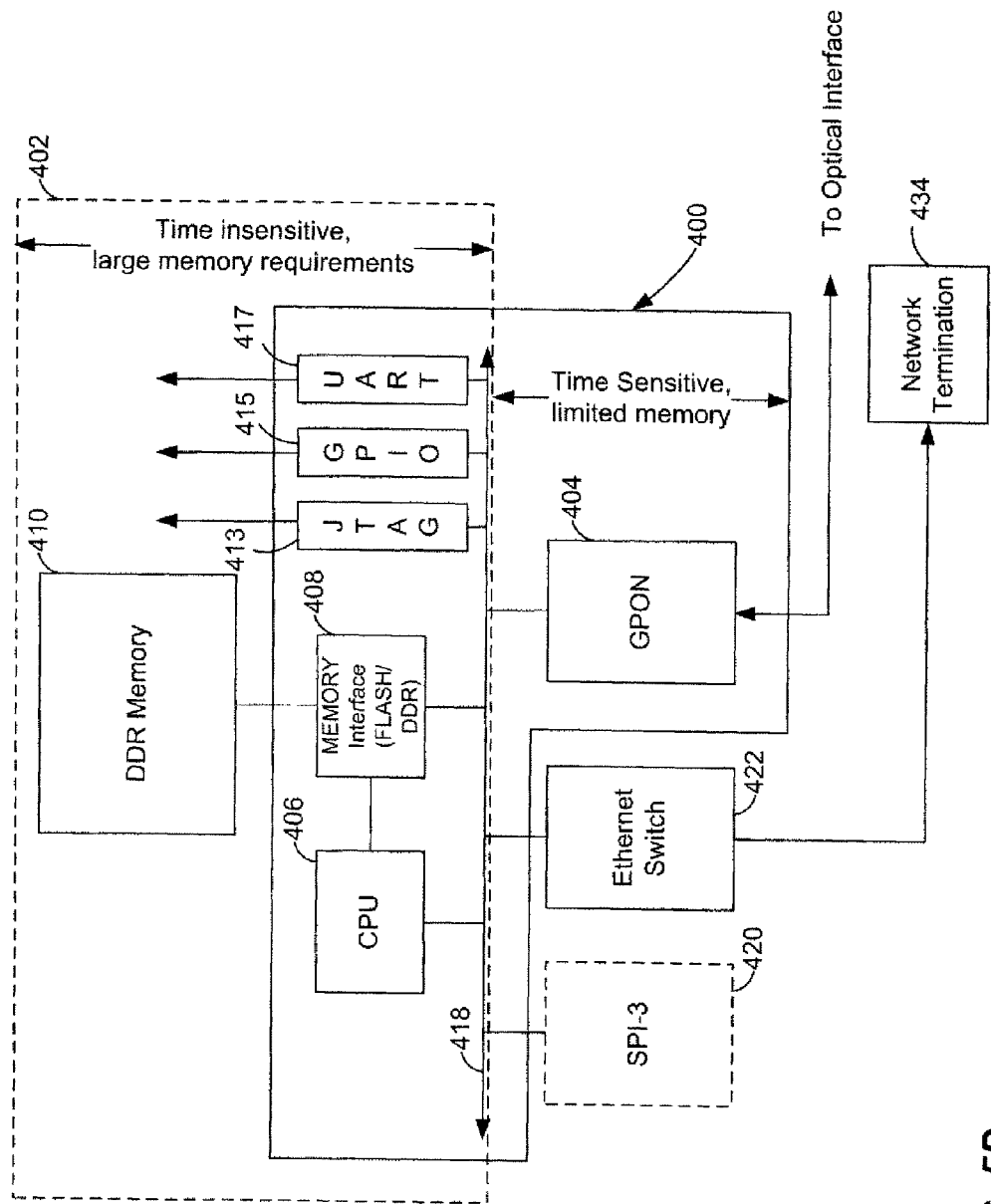

FIGS. 5B-5D show example implementations of the architecture 400 used in an OLT, ONT, and ONU application, respectively. FIG. 5B, for example, shows an OLT application in which the SPI-3 circuit 420 is coupled to the backplane bus 418 as are a synchronous optical network (SONET) 426 and a 10 Gigabit Ethernet circuit 428. FIG. 5C shows an ONT application in which the backplane bus 418 couples to a very high density digital subscriber line (e.g., VDSL or VDSL2) circuit 426 and an asymmetric digital subscriber line (e.g., ADSL or ADSL2) circuit 428. FIG. 5D shows an ONU application, in which the SPI-3 interface 420 is optional and the Ethernet interface 422 is coupled to an Ethernet network termination 434, like the NT 108 shown in FIG. 2. Other layers may also be supported by the architecture 400. Generally, whenever a division of the time sensitive versus non-time sensitive functions is desired, each integrated circuit included in the architecture 400 may include an internal processor for execution of the time sensitive functions and an SoC interface to forward data packets for non-time sensitive functions to the sub-assembly 402 for execution therein.

Although many of the above examples have been described with reference to various wireline technologies, it should be understood that various wireless technologies may be utilized with wireless integrated circuits utilized in the architecture 400, such wireless technologies including, but not limited to, the Institute of Electrical and Electronics Engineers wireless local area network IEEE 802.11 standard, Worldwide Interoperability for Microwave Access (WiMAX), Ultra-wideband (UWB) radio technology, and cellular technology. Generally, whenever a division of the time sensitive versus non-time sensitive functions is desired, each integrated circuit included in the architecture 400 may include an internal processor for execution of the time sensitive functions and an SoC interface to forward data packets for non-time sensitive functions to the sub-assembly 402 for execution therein.

In the context of an OLT 102, the GPON chip 404 further includes a receiver for receiving upstream burst transmissions from an ONT/ONU 104, 106, a transmitter for assembling and transmitting downstream transmissions to the ONT/ONU 104, 106 and an optoelectronic interface to the passive optical network 100. In the context of an ONT 104 or ONU 106, the GPON chip 404 includes a receiver for receiving downstream transmissions from an OLT 102, a transmitter for assembling and transmitting upstream transmissions to the OLT 102 and an optoelectronic interface to the passive optical network 100. The internal processor of the OLT 102 may therefore be used to perform time-sensitive functions associated with the OLT 102, such as assembling the overhead field 202 of a downstream transmission along with functions associated therewith, and processing the overhead field 302 of an upstream transmission along with the functions associated therewith. Likewise, the internal processor of an ONT 104 or an ONU 106 may be used to perform time-sensitive functions associated with the ONT/ONU, such as Media Access Control (MAC). In the example provided below, the GPON chip 404 is described with reference to the upstream and downstream GPON transmission convergence frame formats discussed above. However, it is noted that the inclusion of an internal processor in the GPON chip 404 not only allows for execution of time sensitive functions, but also allows provides the flexibility to adapt the GPON chip 404 to changes in the GTC frame formats and other related GPON functions including MAC, etc.

Figure 6:
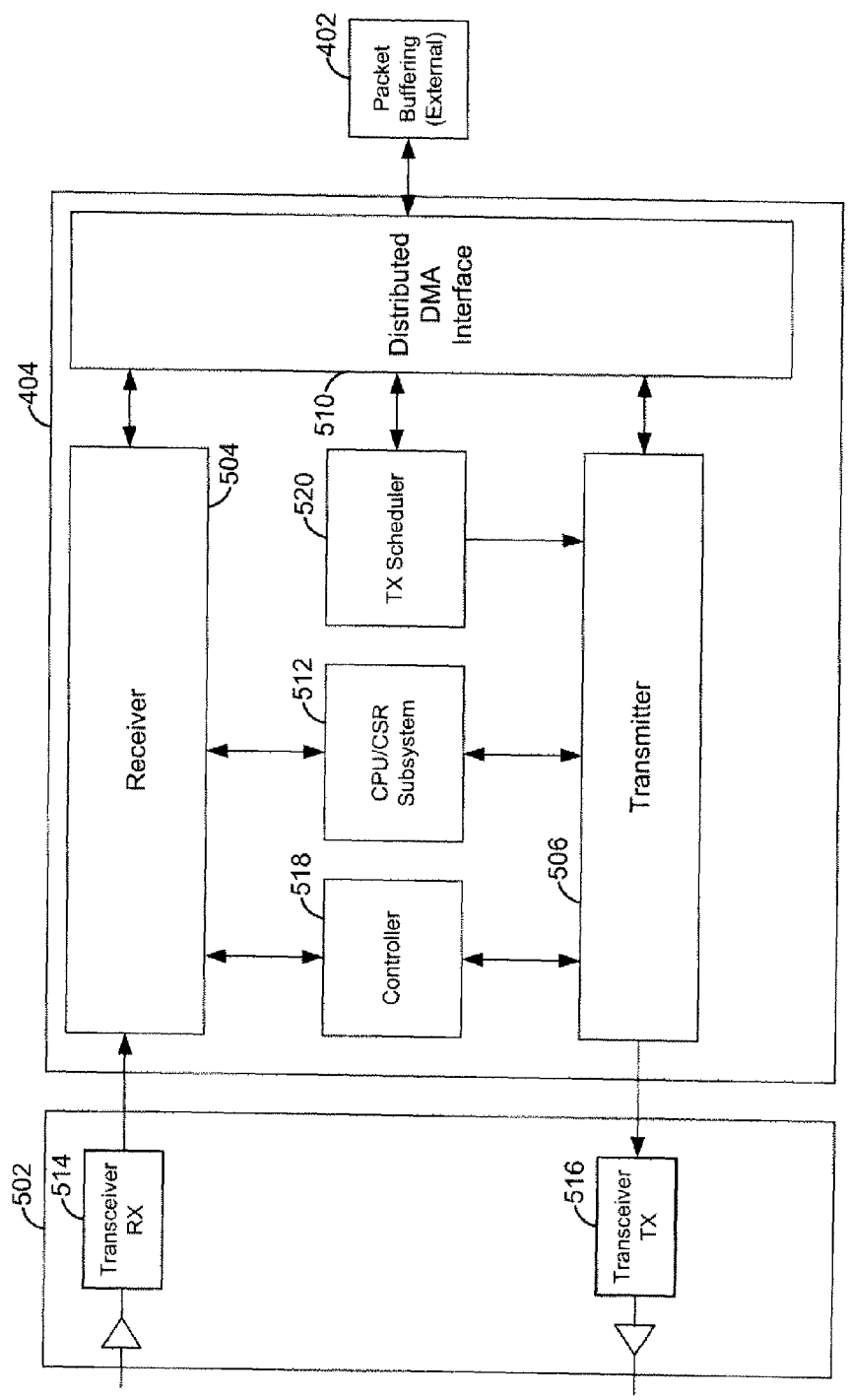
FIG. 6 is a block diagram of an example gigabit passive optical network chip of an integrated circuit within a passive optical network line termination unit, such as the example shown in FIG. 5A.

FIG. 6 is a block diagram of an example of a GPON chip 404 for an OLT 102, an ONT 104 or an ONU 106 shown in FIG. 5A, and will be described in the context of the GTC frame formats discussed above. In particular, the GPON chip 404 is coupled to the passive optical network 100 via an optoelectronic transceiver interface 502, and includes a GPON receiver 504 for receiving upstream burst transmissions from an ONT/ONU 104, 106, a GPON transmitter 506 for assembling and transmitting transmissions over the passive optical network, a distributed direct memory access (DMA) interface 510 to interconnect with the subsystem 402, and an internal processor 512 for processing time-sensitive functions associated with the transmission, such as processing the overhead of a transmission and assembling the frame of a transmission.

The optoelectronic interface 502 generally includes an optoelectronic receiver interface 514 coupled to the GPON receiver 504, and an optoelectronic transmitter interface 516 coupled to the GPON transmitter 506, though it should be understood that different optoelectronic interfaces may be used. The receiver 504 and transmitter 506 generally conform to the transmission format used by the OLT 102, the ONT 104 and the ONU 106, such as the upstream and downstream GTC frame formats provided above. In the case of an OLT 102, upstream GTC frame formatted data is transmitted from the ONT/ONU 104, 106 over the fiber 110, 112 into the optoelectronic receiver interface 514 and is provided to the GPON receiver 504, and downstream GTC frame formatted data is transmitted from the GPON transmitter 506 to the optoelectronic transmitter interface 516 for transmission over the fiber 110, 112 to the ONT/ONU. Likewise, in the case of an ONT 104 or an ONU 106, downstream GTC frame formatted data is transmitted from the OLT 102 over the fiber 110, 112 into the transceiver receiver 514 and is provided to the receiver 504, and upstream GTC frame formatted data is transmitted from the transmitter 506 to the transceiver transmitter 516 for transmission over the fiber 110, 112 to the OLT 102.

in particular, the GPON chip 404 further includes a controller 518, which may be a downstream bandwidth (DSBW) controller for an OLT 102 or a transmission framing controller for an ONT/ONU, which interacts with the transmitter 506 and the internal processor 512 to control the transmitter 506. Generally, the controller 518 and the internal processor 512 enable various functions of the receiver 504 and the transmitter 506. For example, the internal processor 512 may be used to determine errors in the communication link between the OLT 102 and the ONT/ONU, process or provide instructions related to PLOAM messages, perform functions related to PLOAM messages, allocate bandwidth, dynamic ranging and power transmission levels adjustment.

As further seen in FIG. 6, the transmitter 506 is coupled to a TX scheduler 520, the controller 518 and the internal processor 512. The TX scheduler 520 may be a downstream transmission TX scheduler for an OLT 102 or an upstream transmission scheduler for an ONT/ONU. Generally, the TX scheduler 520 may be used for traffic shaping, bandwidth allocation and head-of-line (HOL) arbitration. The distributed DMA interface 510 provides distributed management of the packet buffer (e.g., external memory 410). In particular, the distributed DMA interface 510 provides an interface to the sub-assembly 402, and may be implemented in any integrated circuit 404.

Figure 7:
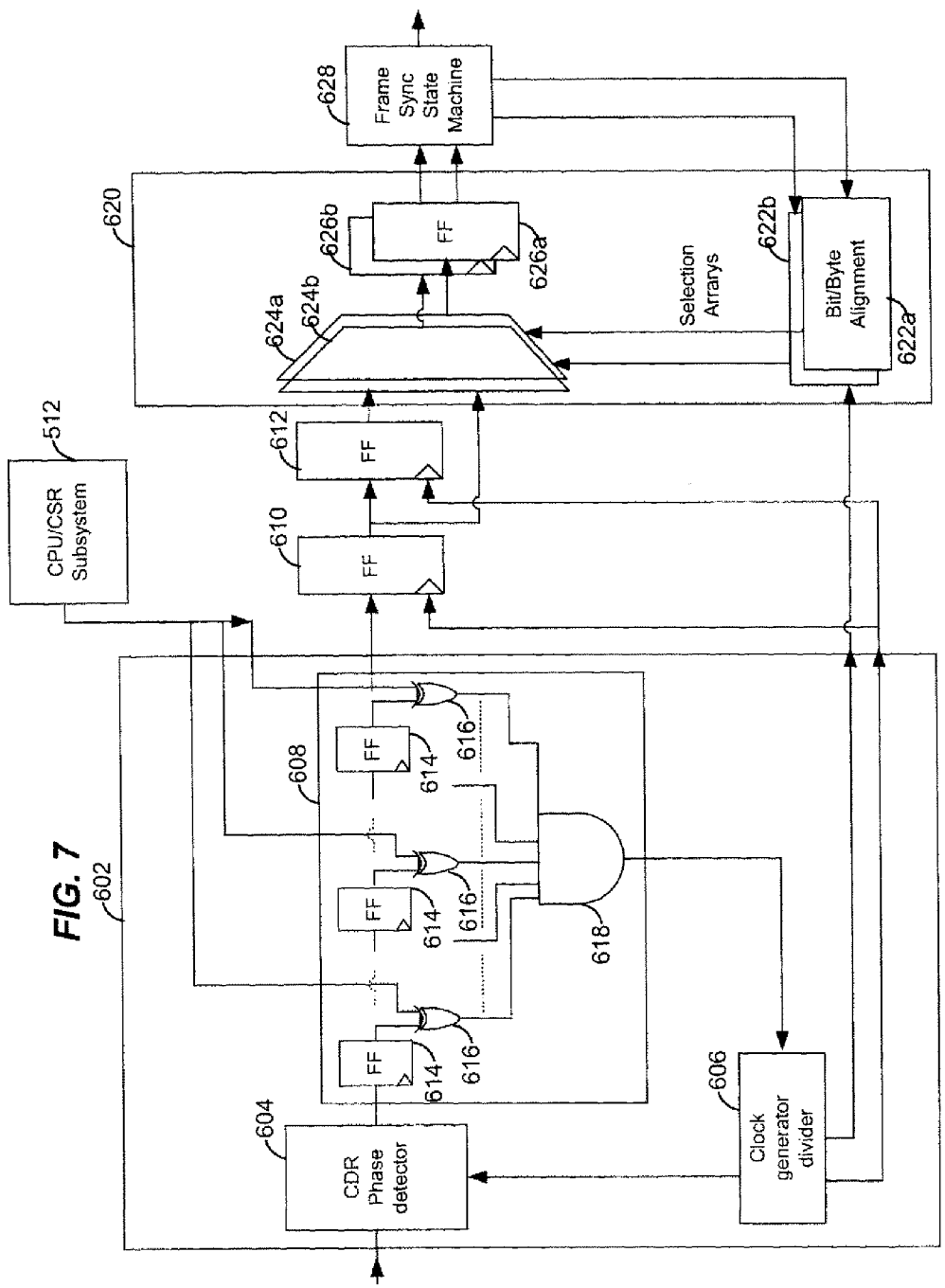
FIG. 7 is a block diagram of an example of a frame synchronization scheme with synchronization pattern searching in a high speed clock domain.

FIG. 7 is a block diagram of an example of a downstream frame synchronization scheme with synchronization pattern searching performed in a high speed clock domain. The downstream frame synchronization scheme may be implemented as a circuit within the receiver 504, such as a deserializer and/or a frame delineation processor. Although the following examples of frame synchronization schemes are explained with reference to the gigabit passive optical network standard, and particularly with reference to downstream transmission rates of 1.244 Gb per second and 2.488 Gb per second for 125 µs data frames, it should be understood that the frame synchronization schemes may be applicable to different transmission rates, different data frame sizes and different data transmission standards where the receiving device synchronizes with a transmission by searching for a predetermined synchronization pattern. In the examples below, transmission line rate is generally a multiple of 8 kHz. Nominal line bit rates for both downstream and upstream transmissions are provided in the table below:

| Down Stream | Up Stream |
| --- | --- |
| 1244.16 Mb/s | 155.52 Mb/s |
| 1244.16 Mb/s | 622.08 Mb/s |
| 1244.16 Mb/s | 1244.16 Mb/s |
| 2488.32 Mb/s | 155.52 Mb/s |
| 2488.32 Mb/s | 622.08 Mb/s |
| 2488.32 Mb/s | 1244.16 Mb/s |
| 2488.32 Mb/s | 2488.32 Mb/s |

As discussed above, the downstream transmission frame for GPON is scrambled using a frame synchronous scrambling polynomial (e.g., $x^7+x^6+1$) following an unscrambled PSYNC field 206 of the frame overhead 202 or physical control block downstream (PCBd). The PSYNC field 206 is a fixed 32-bit pattern, with a coding of 0Xb6ab31e0 that begins every PCBd. The ONU/ONT logic can use this pattern to find the beginning of the frame.

Also in the following examples, the clock frequency for the digital core is approximately 150 MHz or less. Based upon the data transmission speeds provided above (e.g. 1.244 Gb per second and 2.488 Gb per second), a 16-bit wide data bus interface provides core clock speeds of 155.5 MHz or 77.7 MHz for 2.488 Gb per second or 1.244 Gb per second, respectively.

Referring to FIG. 7, a deserializer 602 generally includes a clock data recovery (CDR) phase detector 604, a clock generator divider 606 and a synchronization pattern comparator 608. A downstream data transmission is provided to the CDR phase detector 604 at a downstream data transmission rate of 2.488 Gb per second (or 1.244 GB per second). As the data transmission is input to the CDR phase detector 604, the data frames are provided as a serial transmission. The CDR phase detector 604 generates a clock from a frequency reference, such as a 2.5 GHz (or 1.2 GHz) clock from the clock generator divider 606. The CDR phase detector 604 phase aligns to the data stream with the phase locked loop (PLL) as part of the clock and data recovery. The clock generator divider 606 may further divide the 2.5 GHz (or 1.2 GHz) clock and provide reference clocks of 155.5 MHz (or 77.7 MHz) to the remainder of the data transmission synchronization circuit, as discussed below. The deserializer 602 deserializes the data transmission into a parallel data transmission equal to the bus width (e.g., 16 bits wide). Although not all details for deserializing the data transmission are shown with respect to the deserializer 602, deserialization of the data transmission should be well understood and the deserialization process will not be discussed further herein.

As also shown in FIG. 7, a shift register is provided as a set of flip-flops 610, 612 in series with the deserializer 602, and more particularly, in series with the comparator 608. Each of the flip-flops 610, 612 receives a reference clock from the clock generator divider 606. The shift register receives the deserialized, parallel data transmission along a 16-bit wide data bus into the first flip-flop 610. As the flip-flop 610 is latched via the reference clock from the clock generator divider 606, the data held by the flip-flop 610 is provided to the flip-flop 612, and the flip flop 610 receives the next set of parallel data in the data transmission from the deserializer 602. The flip-flops 610, 612 are shown as 16-bit wide flip-flops to provide a 32-bit shift register. Although only two 16-bit wide flip-flops 610, 612 are shown, it should be understood that shift registers of different stages, such as different flip-flop configurations, may be provided to accommodate different data transmission rates, different core clock speeds, different bus widths and different synchronization pattern sizes.

The comparator 608 is provided to search for a predetermined data pattern within the data transmission, where the predetermined data pattern relates to the synchronization data pattern being searched for by the ONT/ONU. The comparator 608 reads data from the serialized data transmission and compares the data to the predetermined data pattern, which may be provided by the processor 512. In the example provided, the comparator 608 is provided as a 16-bit synchronization pattern comparator. Because the synchronization pattern is a fixed pattern (e.g., 32-bits), the predetermined data pattern used by the comparator 608 for comparison with the incoming serialized data transmission may only be part of the full synchronization pattern, such as a consecutive 16-bit set selected from the 32-bit synchronization pattern (e.g. bits [15:0], [16:1], ... or [31:16]). The predetermined data pattern selected from the synchronization pattern may be a programmable searching pattern provided by the processor 512.

Although different implementations of the comparator 608 may be provided, the comparator 608 in the example of FIG. 7 is provided as several flip-flops 614 coupled in series, and exclusive disjunction circuits 616 (referred to herein as an "exclusive-or" (XOR) circuit or logic gate), where each flip-flop 614 corresponds to an exclusive-or circuit 616. Each flip-flop 614 includes an input, where each bit within the serialized data transmission is coupled in series to the input of the first flip-flop, which outputs the bit of the serialized data transmission to the next flip-flop 614 and to the corresponding exclusive-or circuit 616 when the flip-flop 614 is latched. Each of the predetermined data pattern is provided to an input of a corresponding exclusive-or circuit 616. As such, each exclusive-or circuit 616 compares each bit from the serialize data transmission as it is received to each bit within the predetermined data pattern.

For instance, a bit from the serialized data transmission is provided to the first flip-flop 614 which outputs the bit to the first exclusive-or circuit 616 where the bit is compared to the first bit of the predetermined data pattern. The bit is further provided to the second flip-flop 614 in series which outputs the bit to the second exclusive-or circuit 616 where the bit is compared to the second bit of the predetermined data pattern. At the same time, a second bit from the serialized data transmission is provided to the first flip-flop 614 which outputs the second bit to the first exclusive-or circuit 616 for the second bit as compared to the first bit of the predetermined data pattern.

As a result, each bit within the serialized data transmission is compared against each bit in the predetermined data pattern. In the example provided, a set of 16 bits from the serialized data transmission is compared against the predetermined data pattern during each clock cycle. Each exclusive-or circuit 616 provides an output indicating a match or lack of match between its corresponding bit of the predetermined data pattern and the bit from the serialized data transmission. The outputs of the exclusive-or circuit 616 are provided as inputs to a logical conjunction circuit 618 (e.g. an AND logic gate), which outputs a comparison result of all the exclusive-or circuit 616.

Because the data of the data transmission is provided in series to the comparator 602, a match from each exclusive-or circuit 616 indicates a match between the 16-bit set from the data transmission and the 16-bit predetermined data pattern, which causes the logical conjunction circuit 618 to output a comparison result to the clock generator divider 606 indicating the match. If at least one of the exclusive-or circuits 616 provides an output indicating a lack of a match between its corresponding bit from the predetermined data pattern and a bit from the set of bits from the serialized data transmission, a match between the set of bits and the predetermined data pattern has not been established, and the comparison result from the logical conjunction circuit 616 indicates the lack of a match. The comparator 608 continually shifts the set of bits from the serialized data transmission by one bit by latching the flip-flops 614 or otherwise pushing each bit out of the flip-flops 614 according to the clock cycle provided by the clock generator divider 606. With each shift, the comparator 608 compares a different set of bits from the data transmission (e.g., bits [16:1], [17:2], ... [n:m]) against the predetermined data pattern.

If a match is found as indicated by the comparison result of the comparator 608, the clock generator divider 606 locks the clock divider counter value at the time of the match, and outputs a comparison hit vector to a synchronization detector 620. The synchronization detector 620 is provided as a redundant system having multiple copies of the logic implemented therein. For example, the synchronization detector 620 is provided with duplicate copies of a bit/byte alignment 622a, 622b, a multiplexer 624a, 624b, and a flip-flop 626a, 626b. The bit/byte alignment 622a, 622b provides bit/byte alignment logic and bit selection to the new byte boundary according to the comparison hit vector provided by the clock generator divider 606. The bit/byte alignment 622a, 622b determines a new byte boundary based on the comparison hit vector, because, at the time of the comparison results, the data transmission remains serial bit data and the boundary the frame is unknown. Identification of the boundary will be understood by those of ordinary skill in the art.

Once the boundary has been determined, the multiplexer 624a, 624b is used to align to the data transmission. As the hit vector is provided to the synchronization detector 620, the bits corresponding to the matching data pattern are provided to the shift register. The multiplexer 624a, 624b reads the data from the flip-flops 610, 612 of the shift register, thereby reading the matching data pattern and aligning to the boundary of the data frame. The data pattern is further provided to the flip-flop 626a, 626b to hold the data pattern. A match signal may be provided to a frame synchronization state machine 628 to indicate the synchronization pattern has been found and the boundary of the data for transmission has been aligned thereto. The frame synchronization state machine 628 changes the ONT/ONU between a hunt state, a pre-synchronization state and a synchronization state, as is understood for data frame synchronization.

As indicated above, the synchronization detector 620 is provided as a redundant system having multiple copies of logic. In particular, a match between a set of data from the serialized data transmission and the synchronization pattern (i.e., the predetermined data pattern) is a good indication of an actual match between the full synchronization pattern and the synchronization field (e.g., PSYNC) of a data frame. However, there remains a possibility of a false positive in that a matching set of data from the serialized data transmission is not actually part of the synchronization field. As such, the synchronization detector 620 performs a check between the synchronization field as read from the data transmission and the full synchronization pattern. If a match does not exist with the full synchronization pattern, the data read from the data transmission does not correspond to a matching synchronization field, and the synchronization detector 620 looks for a new comparison hit vector from the clock generator divider 606. However, the receipt of a comparison hit vector locks the synchronization detector 620 from additional comparison hit vectors.

Rather than wait for another data frame, which may be 125 μs in the example provided above, the synchronization detector 620 utilizes the redundant logic to continue searching for additional comparison hit vectors. For example, data from a scrambled payload of a previous data frame may have a 16-bit set that matches the 16-bit predetermined data pattern which causes the clock generator divider 606 to output a comparison hit vector, which is a false positive. However, is possible that a matching PSYNC field will occur within the next data frame (e.g., within the next 125 μs), in which case the clock generator divider 606 will output another comparison hit vector, which may be received by the redundant logic while the first copy is in a locked state. As such, it is possible for the ONT/ONU 104, 106 to more quickly converge to the boundary of the data frame and synchronize with the data transmission rate even in the event of a false positive. Further discussion regarding the operations of the synchronization detector 620 are provided below with respect to FIG. 9. Although two copies of the synchronization detector 620 logic are provided in the example and are generally considered capable of dealing with false positives, is possible that more than two copies may be provided.

Figure 8:
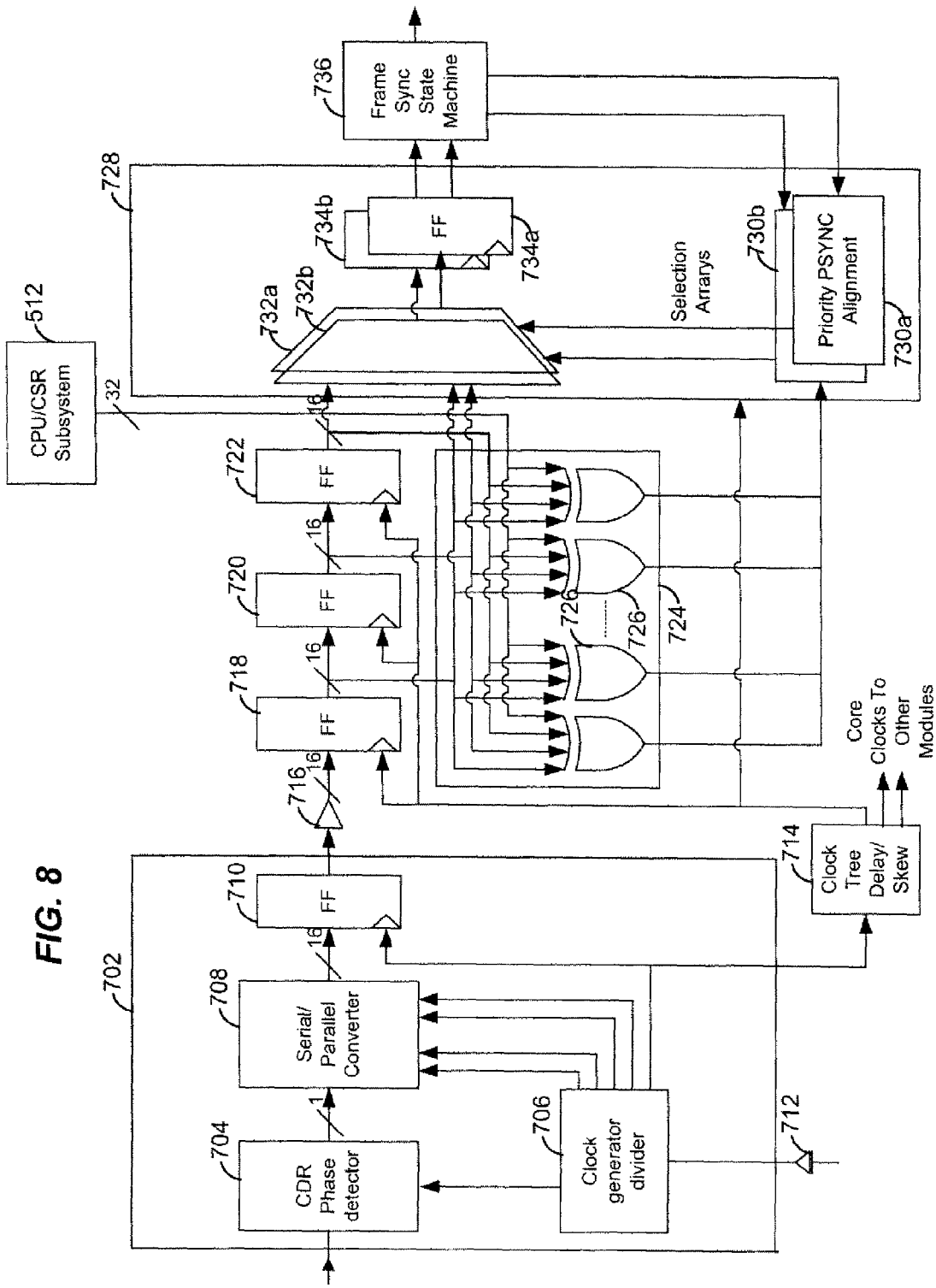
FIG. 8 is a block diagram of an example of a frame synchronization scheme with synchronization pattern searching in a lower speed clock domain.

Although the above example provides a simplified shift register and pattern comparator utilized in the serial fashion to detect the beginning of any data frame, the comparison and synchronization is performed at the same speed as the incoming serial data transmission (e.g. 2.488 GHz or 1.244 GHz). FIG. 8 is a block diagram of an example of a downstream frame synchronization scheme with synchronization pattern searching performed in a lower speed digital domain outside of the deserialization logic. In particular, the pattern matching logic is moved to the digital side running at a lower clock speed, such as 155.5 MHz (or 77.7 MHz). In summary, the example provided in FIG. 8 utilizes a comparison array in parallel with a multistage shift register that searches for a synchronization pattern in a data transmission by comparing sets of data within the deserialized, parallel data transmission against the full synchronization pattern (e.g., the full 32 bits). As seen in FIG. 8, the comparator is provided after the deserializer, and the comparator and the synchronization detector may be provided on a single chip with the deserializer or on a separate chip such as a frame delineation processor in an arrangement similar to that shown in FIG. 1A.

Referring to FIG. 8, a deserializer 702 generally includes a clock data recovery (CDR) phase detector 704, a clock generator divider 706, a serial-to-parallel (S/P) converter 708 and flip-flop 710. A downstream data transmission is provided to the CDR phase detector 704 at a downstream data transmission rate of 2.488 Gb per second (or 1.244 GB per second). As the data transmission is input to the CDR phase detector 704, the data frames are provided as a serial transmission to the S/P converter 708. The CDR phase detector 704 generates a clock from a frequency reference, such as a 2.5 GHz (or 1.2 GHz) clock from the clock generator divider 706. The CDR phase detector 704 phase aligns to the data stream with a phase locked loop (PLL) as part of the clock and data recovery. The clock generator divider 706 may further divide the 2.5 GHz (or 1.2 GHz) clock and provide reference clocks of 155.5 MHz (or 77.7 MHz) to the S/P converter 708 to parallelize the serialized data transmission into 16-bit cycles and to the flip flop 710. That is, the deserializer 702 converts the serial data transmission into a parallel data transmission equal to the bus width (e.g., 16 bits wide), and accumulates the 16-bit cycle of data in the flip-flop 710 before being latched by the clock generator divider 706 to output the 16-bit cycle from the deserializer 702. The clock generator divider 706 may be driven by a reference clock 712 (e.g. 25 MHz).

In the above example, the clock generator divider 706 provides the parallel clock to a clock tree delay and skew block 714, which, in turn, provide a core clock to the remainder of the synchronization circuit as well as to other modules. To compensate for the delay and skew of the clock tree delay and skew block 714, the data of the parallel data transmission are delayed and de-skewed as they are output from the deserializer 702 by inserting a deskewed delay 716.

A multistage shift register is provided as a set of flip-flops 718, 720, 722 in series with the deserializer 702, and in parallel with a comparator 724. Each of the flip-flops 718, 720, 722 receives a reference clock from the clock tree delay and skew block 714. The multistage shift register receives each 16-bit cycle of the deserialized, parallel data transmission along a 16-bit wide data bus into the first flip-flop 718. As the flip-flop 718 is latched via the reference clock from the clock tree delay and skew block 714, the data held by the flip-flop 718 is provided to the flip-flop 720, and the flip flop 718 receives the next cycle of deserialized, parallel data in the data transmission from the deserializer 702. Likewise, a third set of 16-bit data from deserializer 702 is provided to the flip flops 718 and the previous data is shifted down each stage of the shift register in response to further clock signals from the clock tree delay and skew block 714. In the example provided, to shift register holds 48 bits of data from the deserialized, parallel data transmission during each clock cycle.

As shown in FIG. 8, the output of each stage in the multistage shift register is provided to the comparator 724. The comparator 724 is provided as an array of exclusive disjunction circuits 726, referred to herein as exclusive-or circuits 726. In searching for a 32-bit synchronization pattern utilizing a 16-bit bus, the comparator 724 may be provided as a 16×32 pattern searching array (e.g., an array of 16×32 exclusive-or circuits 726, or the equivalent thereof). The full synchronization pattern (e.g., 32-bits) may be provided by the processor 512 to the comparator 724. For example, each bit within the full synchronization pattern may be provided to a column of exclusive-or circuit 726. Each of the bits of the deserialized, parallel data transmission may be provided from the stages of the multistage shift register to the various rows of the array. For example, the flip-flops 718, 720, 722 in the multistage shift register of FIG. 8 hold bits [47:32], [31:16] and [15:0], respectively, of the 48-bit set of data being held by the multistage shift register during any one clock cycle. The first 32 bits within the 48 bit set of data (i.e., [31:0]) may each be provided to an input of a corresponding exclusive-or circuit 726 in the first row of the array (e.g., XOR logic gates 1-32 of row 1). As explained above, each of the exclusive-or circuit 726 in each row receives a corresponding bit of the full synchronization pattern. As such, bits [31:0] of the 48 bit set are compared against bits [31:0] of the full synchronization pattern, respectively. The bits from the 48 bit set of data provided to the second row of exclusive-or circuits 726 may be shifted by one bit, such that bits [32:1] are compared to bits [31:0] of the full synchronization pattern, respectively. In the example given above, a 48-bit set of data is used to search for a 32-bit synchronization pattern due to a 16-bit bus and corresponding 16-bit sets of deserialized, parallel data (e.g. 16-bit cycles), because a matching 32-bit synchronization pattern with the data transmission may be spread across as many as three 16-bit sets of the serialized data. As a result, each possible data pattern within a set of data may be compared against the full synchronization pattern in order to find a matching data pattern.

The comparator 724 thus searches free-running data matching the pattern at every possible bit boundary, and outputs comparison results to a synchronization detector 728. The comparator 724 is able to look for the full synchronization pattern in every possible position in order to get a correct pattern, and the array of exclusive-or circuits is utilized to match all possible positions of the synchronization pattern. In other words, the comparator is able to search for a synchronization pattern having a data width larger than the width of the bus interface, by essentially sliding or shifting each bit within a deserialized, parallel data transmission to compare each data pattern or set within the data transmission against the full synchronization pattern. The incoming deserialized, parallel data transmission is grouped into 48-bit data blocks and presented to the comparator 724, which is provided as an array of comparators 1-16 each corresponding to a row in the array. These comparators match the bit-shifted incoming data to the synchronization pattern across a 48-bit wide window at 32-bits at a time.

In the example provided above with a 16×32 pattern searching array, 16 comparison results are provided to the synchronization detector 728 during each clock cycle, with each comparison result comprising 32 bits. As an alternative, the output of each exclusive- or circuit within each row of the array may be provided as an input to a logical conjunction circuit (e.g., an AND logic gate), which provides an output to the synchronization detector 728 indicating a match if all exclusive-or circuits with that row indicate a match. As such, the synchronization detector 728 may receive 16 comparison results of only one bit each. Further, while a 16×32 array has been described, the size of the array may be reduced to a lower number by limiting the initial comparison to a nibble, byte, or 16-bit boundary search algorithm. This alternate approach results in a smaller array, and adds control circuitry for tracking the synchronization pattern bit positioning. Using a full synchronization pattern width comparison (e.g., 32 bits) provides a higher confidence level that a full synchronization pattern match has been achieved. Using 4-bit, 8-bit, 16-bit comparators could end up in situations where multiple matches are found within a sampling window, with some of the matching resulting as false-positive values.

The flip-flops 718, 720, 722 are shown as 16-bit wide flip-flops to provide a 48-bit shift register. Although only three 16-bit wide flip-flops 718, 720, 722 are shown, it should be understood that shift registers of different stages, such as different flip-flop configurations, may be provided to accommodate different data transmission rates, different core clock speeds, different bus widths and different synchronization pattern sizes. For example, the shift register may be provided as a 32-bit shift register using two 16-bit wide flip-flops, and the comparator 724 may be provided to search for the synchronization pattern in a 32-bit window shifted 16 bits every cycle. Further, although the comparator 724 has been described as an array of exclusive-or circuit 726 each having two inputs and an output to compare one bit of a set of data from the deserialized data transmission to one bit of the full synchronization pattern, it should be understood that different implementations of the comparator 724, including different implementations of the array, may be provided to compare the full synchronization pattern against a deserialized data transmission, in order to find a matching synchronization field in the data transmission frame.

As with the synchronization detector 620 above, the synchronization detector 728 is provided as a redundant system having multiple copies of logic implemented therein. Although the full synchronization pattern is searched, there remains a possibility of a false positive in that a matching data pattern from the deserialized, parallel data transmission is not actually the synchronization field. The synchronization detector 728 utilizes the redundant logic to continue searching for additional comparison results, in case a further matching comparison result is generated. Copies of the synchronization detector logic that are not locked may perform alignment resulting from any additional matches. For example, the synchronization detector 728 is provided with duplicate copies of a priority synchronization field (e.g., PSYNC) alignment 730*a*, 730*b*, a multiplexer 732*a*, 732*b*, and a flip-flop 734*a*, 734*a*. The priority synchronization field alignment 730*a*, 730*b* provides a match based on the comparison result of the comparator 724. Because the full synchronization pattern is searched, the priority synchronization field alignment 730*a*, 730*b* is able to identify the boundary of the data transmission, and selects the first matching data pattern among the comparison results.

The multiplexer 732*a*, 732*b* is used to align to the data transmission. As the comparison results are provided to the synchronization detector 728, the bits corresponding to the matching data pattern are provided from the shift register. The multiplexer 732*a*, 732*b* reads the data from the flip-flops 718, 720, 722 of the shift register, thereby reading the matching data pattern and aligning to the boundary of the data frame. The data pattern is further provided to the flip-flop 734*a*, 734*b* to hold the data pattern. A match signal may be provided to a frame synchronization state machine 736 to indicate the synchronization pattern has been found and the boundary of the data for transmission has been aligned thereto. As above, the frame synchronization state machine 736 changes the ONT/ONU between a hunt state, a pre-synchronization state and a synchronization state.

Figure 9:
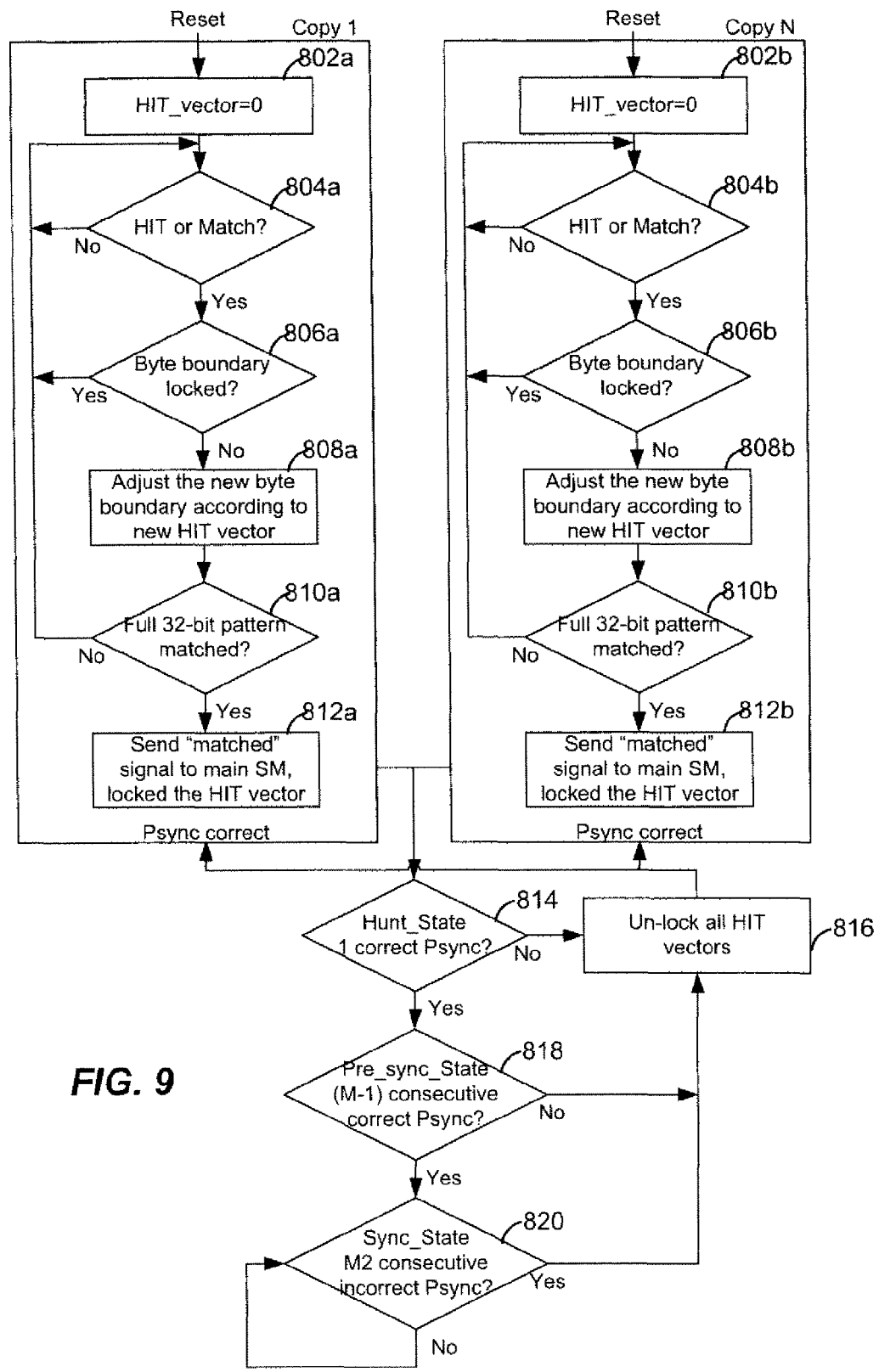
FIG. 9 is a flow diagram a synchronization routine based upon a synchronization pattern search result.

FIG. 9 is a flow diagram a synchronization routine based upon a synchronization pattern search result which may be performed by the synchronization detector 728 and the frame synchronization state machine 736. The synchronization routine of FIG. 9 is further applicable to the synchronization detector 620 and the frame synchronization state machine 628 of FIG. 7. As seen in FIG. 9, the redundancy of the synchronization detector 728, 620 is indicated by the multiple copies of a portion of the routine (e.g., Copy 1, Copy N). Again, while two copies are depicted, more than two copies may be provided.

Each copy of the synchronization detector logic may be initialized with a comparison hit vector of zero at block 802*a*, 802*b* as provided by the clock generator divider, for example during a power up a routine and/or reset. As the data bits of a downstream data transmission are provided to the shift registers, the synchronize routine waits for a comparison hit vector or comparison result indicating a match at block 804*a*, 804*b*. If a comparison hit vector is generated or a comparison result is generated indicating a match, the current clock generator divider counter value is locked and the byte alignment logic, bit selection, aligns the new byte boundary according to the comparison hit vector or comparison result at block 808*a*, 808*b*, provided the boundary is not already locked, as determined at block 806*a*, 806*b*.

Operating in parallel, all unlocked copies of the synchronization detector logic check the full synchronization pattern at block 810*a*, 810*b* to verify the match. If the match is verified, the matched signal (e.g., PSYNC correct) is sent to the frame synchronization state machines 628, 736. The ONT/ONU 104, 106 implements the synchronization state machine by beginning in the hunt state at block 814. The search for a matching synchronization pattern is performed while the ONT/ONU 104, 106 is in the hunt state. As long as the synchronization state machine does not receive a correct synchronization pattern, the ONT/ONU 104, 106 keeps all copies of the synchronization detector logic unlocked at block 816. If the ONT/ONU 104, 106 is in the hunt state, the synchronization state machine will select the earliest matched synchronization signal from one of the copies of the synchronization detector logic, lock the HIT vector, and transition to the pre-sync state.

Upon transitioning into a pre-sync state at block 818, the ONT/ONU 104, 106 sets a counter (M−1). The ONT/ONU 104, 106 looks for another synchronization pattern that follows the last one by the length of the data frame (e.g., 125 μs). In pre-sync state, the ONT/ONU 104, 106 monitors the matched signal from the selected copy of the station detector logic. For each correct synchronization field during the pre-sync state, the counter is incremented. If an incorrect (or no correct) synchronization field is found after 125 μs, the ONT/ONU 104, 106 unlocks the hit vector at block 816 and transitions back to the hunt state at block 814. In the pre-sync state, the ONT/ONU 104, 106 counts the consecutive correct synchronization patterns at every 125 μs. If the counter ever equals M−1, the ONT/ONU 104, 106 transitions into a synchronized state at block 820, in which the ONT/ONU 104, 106 is synchronized with the downstream data transmission.

Once the ONT/ONU 104, 106 reaches the synchronized state at block 820, the ONT/ONU 104, 106 determines it has found the downstream frame structure, and processes the PCBd information. In the synchronized state, the ONT/ONU 104, 106 continuously checks the synchronization matched signal every 125 μs. However, if the ONT/ONU 104, 106 detects M consecutive incorrect synchronization fields, the ONT/ONU 104, 106 determines it has lost the downstream frame alignment, transitions back to the hunt state at block 814 and unlocks the comparison hit vectors at block 816.

Figure 10:
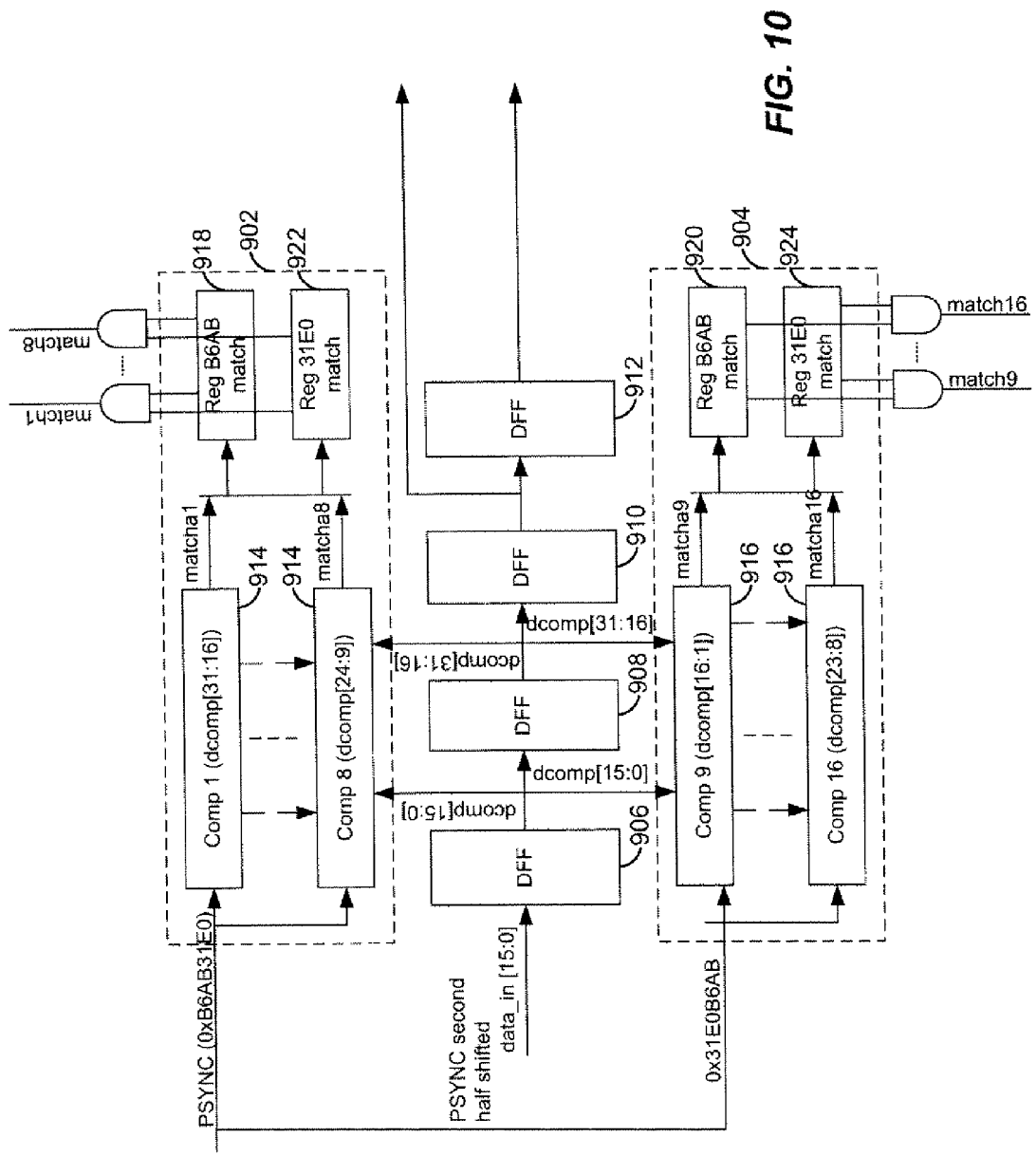
FIG. 10 is a block diagram of another example of a frame synchronization scheme with synchronization pattern searching in a lower speed clock domain.

FIG. 10 is an example of another downstream frame synchronization scheme with synchronization pattern searching being performed in the lower speed digital domain outside of the deserialization logic. In particular, the example provided in FIG. 10 utilizes separate comparison arrays in parallel with a multistage shift register that searches for a synchronization pattern in a data transmission by comparing a first set of data within the deserialized, parallel data transmission against the first half synchronization pattern and also against a second half of the synchronization pattern, where the data pattern is provided in 16-bit cycles. As seen below, the comparator is provided after the deserializer, and the comparator and the synchronization detector may be provided on a single chip with a SERDES or on a separate chip such as a frame delineation processor in an arrangement similar to that shown in FIG. 1A. In the example provided below, a 24-bit window is processed at 16 bits at a time and generally utilizes less comparison circuitry than the 48-bit window example above, with additional complexity on the tracking control to find matching data patterns.

Referring to FIG. 10, separate comparators 902, 904 are provided in parallel with a multistage shift register provided as a set of flip-flops 906, 908. Further delay flip-flops 910, 912 are provided to store each data pattern for alignment based on the results from the comparators 902, 904, and to accommodate the delay caused by the comparators 902, 904 and subsequent frame delineation. Although not shown, the multistage shift register may be provided in series with a serializer/deserializer similar to that shown in FIG. 8. For example, each of the flip-flops 906, 908 may receive a reference clock from a clock tree delay and skew, and the multistage shift register receives each 16-bit cycle of the deserialized, parallel data transmission along a 16-bit wide data bus into the first flip-flop 906. As the flip-flop 908 is latched, the data held by the flip-flop 906 is provided to the flip-flop 908, and the flip flop 906 receives the next cycle of deserialized, parallel data in the data transmission from the deserializer. Likewise, a third set of 16-bit data from the deserializer is provided to the flip flop 906 and the previous data is shifted down each stage of the shift register in response to further clock signals. In the example provided, the shift register holds 32 bits of data from the deserialized data transmission during each clock cycle.

As shown in. FIG. 10, the output of each flip-flip 906, 908 is provided to each of the comparators 902, 904. Similar to the comparator 724 of FIG. 8, the comparators 902, 904 may each be provided as an array of comparators 914, 916 respectively, and, more particularly, as an array of exclusive-or circuits (not shown). In the example provided, the comparators 902, 904 are each provided as eight 16-bit comparators 914, 916 (e.g., 8 by 16 pattern searching arrays) where each comparator 914, 916 may have 16 exclusive-or circuits, or the equivalent thereof, as compared to the 16 by 32 pattern searching array which may be used by the comparator 724.

The synchronization pattern (e.g., 32-bits) may be provided to each comparator 902, 904, with the full synchronization pattern (e.g., B6AB31E0) provided to the upper comparator 902 and a second half shifted synchronization pattern (e.g., 31E0B6AB) provided to the lower comparator 904. Both comparators 902, 904 compare the same data in the deserialized data transmission at a time (e.g., 24 of the 32 bits held by the shift register and cycled 16 bits at a time). Although not shown, the full synchronization pattern and the second half shifted synchronization pattern may be provided by the processor 512.

The upper comparator 902 searches for the first half of the synchronization pattern in the data transmission by searching the first eight data patterns from the data provided by the shift register, with each data pattern shifted by one bit in the inputs to the comparators 914. In the example provided, each bit within the first half of the full synchronization pattern may be provided to each comparator 914 (e.g., each row of exclusive-or circuits). In the example provided, the input of the comparators 914 is 16-bits wide and alternates between the first and second half of the full synchronization pattern with every clock cycle (e.g., B6AB and 31E0). For example, 16-bit data patterns from the 32-bit data of the deserialized, parallel data transmission may be provided from the stages of the multistage shift register to the various columns, with each data pattern shifted by one bit for each row. In this example, the flip-flops 906, 908 in the multistage shift register hold bits [1.5:0] and [31:16], respectively, of the 32-bit set of data being held by the multistage shift register during any one clock cycle. The first 16 bits within the 32-bit set of data (i.e., [31:16]) may each be provided to an input of a corresponding comparative exclusive-or circuit in the first row of the array (e.g., Comp 1; XOR logic gates 1-16 of row 1). Each comparative exclusive-or circuit in each row receives a corresponding bit of half of the synchronization pattern. As such, bits [31:16] to [24:9] of the 32-bit set are compared against bits [15:0] (e.g., 31E0) or [31:16] (e.g., B6AB) of the synchronization pattern, respectively, on a single clock cycle. Similarly, the bits from the 32-bit set of data provided to the second row of comparative exclusive-or circuits (e.g., Comp2) are processed such that bits [23:8] to [16:1] are compared to bits [15:0] (e.g., 31E0) or [31:16] (e.g., B6AB) of the synchronization pattern, respectively, on the same clock cycle as above. The input of the synchronization pattern to the comparators 914 alternates between the first and second half (e.g., B6AB and 31E0 values) in every clock cycle. As a result, data patterns within a set of data (e.g., the first eight phases and the second eight phases) may be compared against the two halves of the synchronization pattern during any one clock cycle in order to find a data pattern that matches part of the synchronization pattern.

During any clock cycle, the lower comparator 904 utilizes a similar arrangement of comparators 916 to that of the upper comparator 902, and compares the data patterns [23:8] to [16:1] sets of data to the synchronization pattern. However, the input of the synchronization pattern is half-shifted such that the first half is switched with the second half As such, during a half clock cycle, the upper comparator 902 searches the data from the shift register for the first half of the synchronization pattern while the lower comparator 904 searches the data for the second half of the synchronization pattern. During the next half clock cycle, the upper comparator 902 searches for the data from the shift register for the second half of the synchronization pattern while the lower comparator 904 searches data for the first half of the synchronization pattern. During the next clock cycle, the data in the shift register is shifted by 16 bits, and the above process starts again. In other words, the lower comparator is shifted in time as compared to the upper comparator each half clock cycle. Thus, the upper comparators start with 0xB6AB, while the lower comparator uses 0x31E0. Once the upper comparator processes the 0x31E0 value, the lower comparator processes the 0xB6AB pattern.

Each of the comparators 914, 916 outputs comparison results to a register, with registers 918, 920 maintained for comparison results relating to the first half of the synchronization pattern, and registers 922, 924 maintained for comparison results relating to the second half. In the example shown, each register may be 16 bits wide and is coupled to an array of AND-gate circuits helping to pick one of the registers 918 or 922, and 920 or 924. If any one of the comparators 914, 916 indicates a match, a comparison result indicating the match is outputted. In one example, the match is provided to a synchronization detector, such as the synchronization detectors 620, 728 discussed above, but with the additional tracking control able to utilize the match outputs from the comparators 902 and 904 to recognize a synchronization pattern within a block period, or across a clock period and the next contiguous clock cycle.

Although FIG. 10 has been described with reference to a particular example of how data from the data transmission may be compared to the synchronization pattern, it should be understood that the downstream frame synchronization scheme of FIG. 10 may be modified to change the particular bit comparisons performed by the comparators 902, 904. As such the downstream frame synchronization scheme of FIG. 10 is not limited to the particular assignment or arrangement of the bits for comparison, and is not limited to the specific manner in which the comparison is executed. Instead, the downstream frame synchronization scheme may be programmable to change how the bits are assigned to, and compared by, the comparators 902, 904 so as to change the operation of the downstream frame synchronization scheme while maintaining the same architecture.

Figure 11:
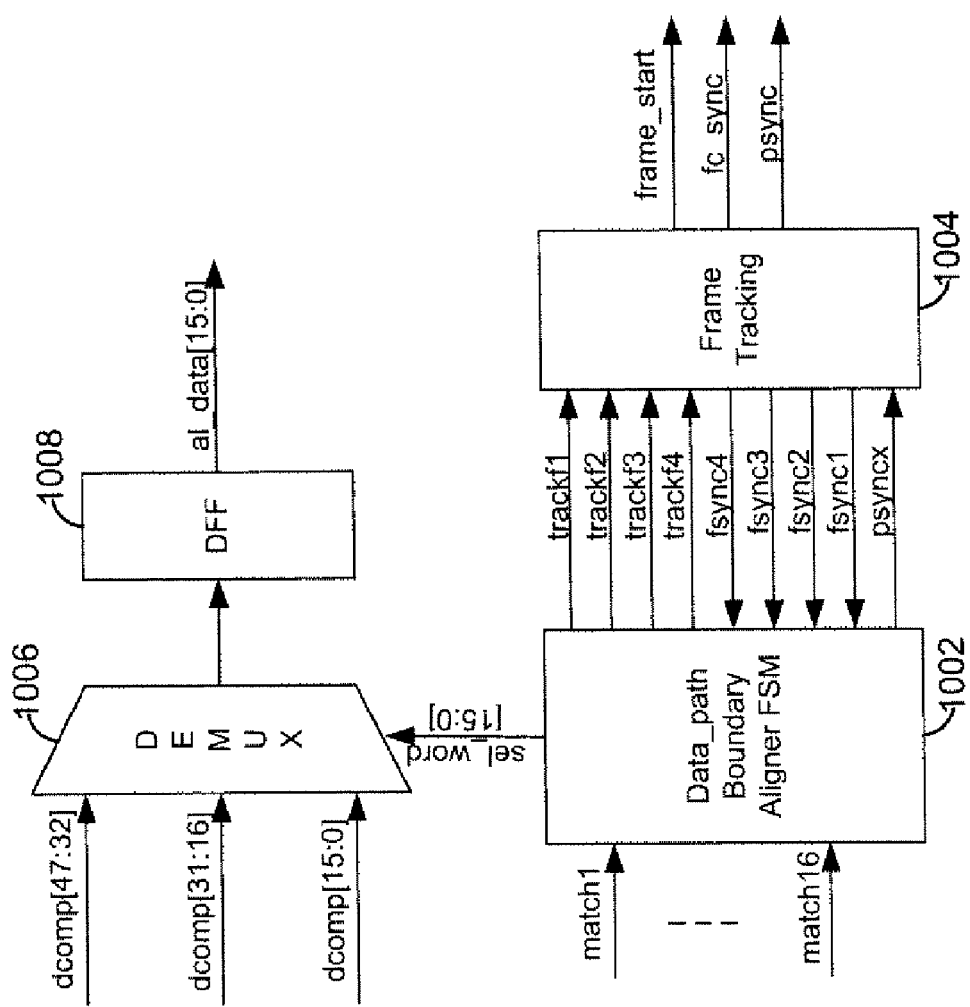
FIG. 11 is a block diagram of an example of a frame delineation scheme that may be implemented with the frame synchronization schemes of FIGS. 7, 8 and 10.
Figure 12:
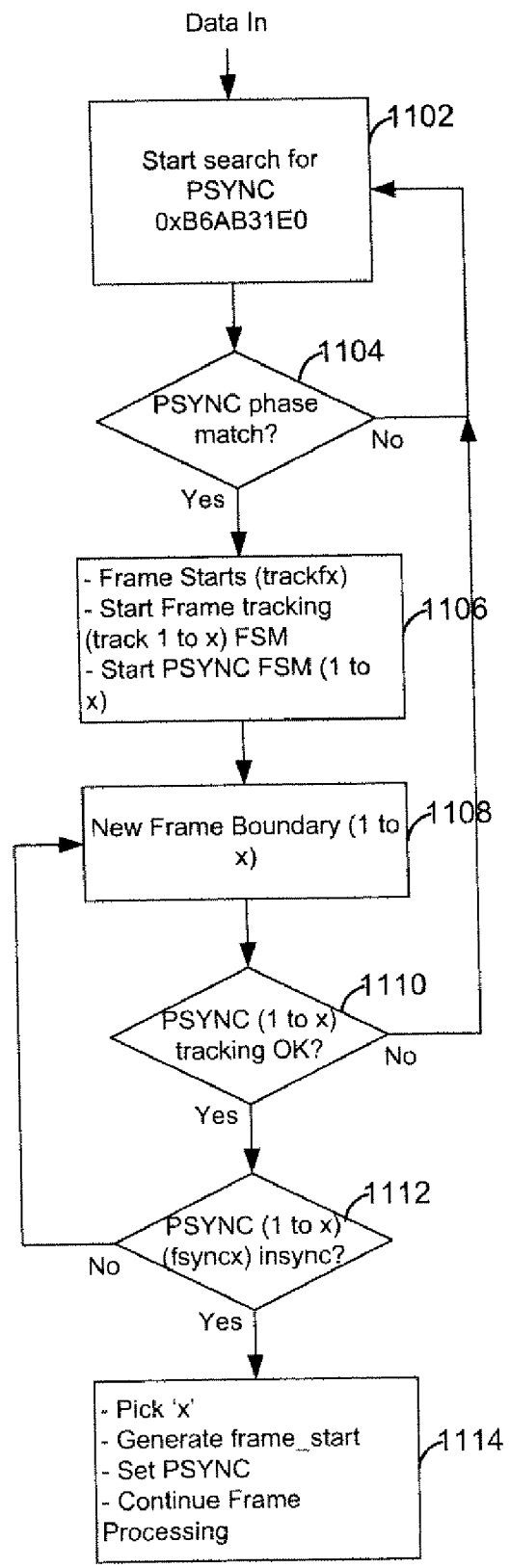
FIG. 12 is a flow diagram a delineation routine based upon a synchronization pattern search result.

FIG. 11 is a block diagram of a frame delineation scheme that may be implemented with the frame synchronization schemes of FIGS. 7, 8 and 10. FIG. 12 is a flow diagram explaining the delineation routine performed by the frame delineation scheme of FIG. 11. Although each of FIGS. 7 and 8 have been discussed with reference to a synchronization detector 620, 728, FIG. 11 provides an alternative scheme to the synchronization detector 620, 728 discussed above. In addition, the scheme of FIG. 11 may be utilized with the comparator outputs of the frame delineation schemes of FIG. 8 (e.g., match1, match 2), as discussed herein, though it should be understood that the scheme of FIG. 11 may also be applied to the frame delineation scheme of FIG. 10 so as to utilize the comparator outputs of FIG. 10 (e.g., match1, match8, match9, match16). The scheme of FIG. 11 and the routine of FIG. 12 are used to find the synchronization pattern in the data transmission and begin counting the occurrence of the synchronization pattern as measured in intervals equivalent to the duration of each data transmission frame (e.g. 125 µs). For example, if the comparator provides more than one comparison result within 125 µs interval, the scheme and routine discussed below determines which comparison result relates to a false positive, and which comparison result relates to the synchronization pattern, if any. Once the correct synchronization pattern has been found, the scheme and routine are able to delineate the data transmission frames and provide synchronization with the data transmission.

Referring to FIG. 11, a boundary aligner 1002 receives a comparison result or comparison hit vector from a comparator, such as the comparators discussed above. The comparison results sent to the boundary aligner correspond to the outputs of the comparator and represent the maximum number of possible data phases in the incoming data stream. The boundary aligner 1002 delineates the data transmission frame based on frame tracking signals (trackfx) assigned to each comparison result indicating a match between a data pattern and the synchronization pattern. As shown in the example, the possibility of 4 comparison results indicating a match within the data transmission in a given time frame equivalent to a data frame duration (e.g. 125 µs) is provided. However, it should be understood that while at least two comparison results are generally provided delineating data transmission frames while identifying false positives, the number of comparison results that may be taken into account may be vary depending on the probability of the synchronization pattern occurring randomly within a date transmission.

Upon receiving each comparison result indicating a match between a data pattern and the synchronization pattern, the boundary aligner 1002 assigns a frame tracking signal to the comparison result, and provides the frame tracking signal to a frame tracker 1004. Upon receiving a frame tracking signal, the frame tracker 1004 searches for the start boundary of the data transmission frames. As multiple frame tracking signals may be generated by the boundary aligner 1002 and received by the frame tracker 1004, the frame tracker separately searches for the start boundary based on each frame tracking signal.

The frame tracker 1004 may implement a number of finite state machines, such as that shown in FIG. 1B, which may be implemented in hardware or in software, such as logical objects. For example, the finite state machine illustrated in FIG. 1B may be implemented in the frame tracker 1004 as an object-based implementation of the technique described herein. As is also well known in the art, objects (such as the objects which may be utilized in connection with FIGS. 1B, 11 and 12) are software abstractions that represent collections of methods or processes (i.e., software routines) which are encapsulated along with data that is needed to carry out the methods of the objects. Such object-oriented software programming techniques are well known in the art and, therefore, will not be described in greater detail herein. As such, while the following discusses state machines that may be used to search for the start boundary of the data transmission frames, a should be understood that various other implementations may be utilized to track repeated occurrences of the synchronization pattern within the data transmission in order to confirm that the matching data pattern corresponds to the synchronization pattern, including hardware and software implementations.

Generally, the frame tracker 1004 may implement a number of finite state machines equivalent to the number of frame tracking signals, such that each finite state machine may operate in parallel to search for the start boundary (e.g. PSYNC) of the data transmission frames. Each state machine begins in a hunt or search state, in which the frame tracker 1004 waits for a frame tracking signal assigned to a comparison result indicating a match between a data pattern and the synchronization pattern, PSYNC. During the hunt state, the comparator searches for the synchronization pattern in the data transmission (block 1102 in FIG. 12). Once such a comparison result is received by the boundary aligner 1002 (block 1104 in FIG. 12), a frame tracking signal is assigned to the comparison result and the frame tracking signal is provided to the frame tracker 1004. Upon receiving the frame tracking signal, the finite state machine transitions into the pre-synchronization state (block 1106 in FIG. 12).

Because the duration of each data transmission frame is known (e.g., 125 μs), the frame tracker 1004 searches for the occurrence of subsequent synchronization patterns in the data transmission pattern at intervals equivalent to the duration of each data transmission frame. In other words, the frame tracker 1004 tracks whether the matching data pattern repeats itself, for example every 125 μs, thereby confirming that the matching data pattern is the synchronization pattern. As such, the state machine corresponding to the frame tracking signal assigned to the comparison result indicating a match between the data pattern and synchronization pattern maintains a count of the number of times the synchronization pattern occurs every 125 μs beginning with the matching data pattern (block 1108 in FIG. 12). For every correct synchronization pattern found in 125 μs intervals, the counter is incremented.

In one example, the comparator may be utilized to monitor the repetition of the synchronization pattern in the data transmission every 125 μs. In particular, the comparator may continue to compare the incoming data transmission to the synchronization pattern and provide comparison results to the boundary aligner 1002. For each comparison result received by the boundary aligner 1002, the boundary aligner 1002 assigns a frame tracking signal which is provided to the frame tracker 1004. If the frame tracking signal is provided at an interval of the duration of a data transmission frame (e.g., 125 μs), the state machine maintaining the count may use the occurrence of the frame tracking signal as an indication that the synchronization pattern has occurred at an interval of the known transmission duration. On the other hand, if the frame tracker 1004 does not receive a frame tracking signal at such an interval, the state machine maintaining the count may determine that an incorrect synchronization pattern has been found, and may revert to the hunt state based on the count.

If the counter reaches a predetermined threshold (e.g. two or three), the frame tracker 1004 may determine that it has found the synchronization pattern within the data transmission (block 1110 in FIG. 12), and the state machine transitions into a synchronization state (block 1112 in FIG. 12). However, it is noted that during the pre-synchronization state, if an incorrect pattern is found in searching for a repeat of the synchronization pattern, the state machine transitions back to the hunt state (block 1110 of FIG. 12). Upon reaching a synchronization state, the frame tracker 1004 may output a synchronization signal (fsyncx) indicating the frame tracking signal assigned to the conformed data pattern (block 1114 in FIG. 12). The boundary aligner 1002 may use the synchronization signal as an indication that the data pattern corresponding to the comparison results to which the frame tracking signal is assigned should be selected as the synchronization pattern. Because the boundary aligner 1002 and the frame tracker 1004 may accommodate multiple matching data patterns, and maintain state machines in parallel to each search for the start boundary of the frames of the data transmission based on different frame tracking signals, synchronization and alignment with the data transmission may be based on the first state machine to achieve a synchronization state in response to detecting successive occurrences of the synchronization pattern in the data transmission based upon an initial matching data pattern.

In response to the synchronization signal, the boundary aligner 1002 enables a data selection signal to be output to a demultiplexer 1006. The data selection signal causes the demultiplexer 1006 to select the data pattern corresponding to the synchronization signal output by the frame tracker 1004. As the data selection signal is enabled, the boundary aligner 1002 provides an acknowledgment (psyncx) to the frame tracker 1004. In response thereto, the frame tracker 1004 outputs a frame_start signal indicating the start of the frame and outputs a synchronization state signal (psync) to indicate the data transmission frames have been delineated and synchronization with the data transmission has been achieved.

A delay flip-flop 1008 is used to hold and delay the data selected from the demultiplexer 1006, and the data is released from the flip-flop 1008 in alignment with the frame_start signal and the synchronization state signal. Thereafter, the ONT/ONU is considered to be in alignment with the data transmission and may begin to process the PCBd information of the data transmission frames.

While the ONT/ONU is in synchronization with the data transmission, the comparator may continue to compare the incoming data transmission with the synchronization pattern in order to monitor the synchronization state of the ONT/ONU. As such, the comparator will continue to output a comparison result at successive intervals equivalent to the data transmission frame duration indicating a match between a data pattern within the data transmission and the synchronization pattern. The boundary aligner 1002 may continue to receive the comparison results and assigned a frame tracking signal to each comparison result indicating a match. In turn, the frame tracker 1004, and in particular the state machine maintaining the count, may monitor the occurrence of the frame tracking signals. If the frame tracker 1004 does not received a frame tracking signal in successive intervals of the data transmission frame duration, the state machine may increment a counter to maintain a count of the non-occurrence of the synchronization pattern in the data transmission. In one example, the count may be maintained with respect to successive non-occurrences of the synchronization pattern. If the count reaches a predetermined threshold, the frame tracker 1004 may determine that synchronization and alignment with the data transmission has been lost. Accordingly, the state machine reverts back to the hunt state, and the frame tracker 1004 may output a synchronization state signal indicating a lack of synchronization with the data transmission.

Based upon the above description, it should be understood that the delineation scheme and routine shown in FIGS. 11 and 12 may correspond to the synchronization detector of FIGS. 7 and 8. In particular, while the delineation scheme and routine of FIGS. 11 and 12 depict an example of delineating data transmission frames based upon multiple data patterns occurring within a data transmission interval equivalent to a data transmission frame duration that match the synchronization pattern while accounting for false positives, the delineation scheme and routine of FIGS. 11 and 12 utilize repeated occurrences of the synchronization pattern at intervals equivalent to the data frame transmission frame duration. Accordingly, the delineation scheme and routine of FIGS. 11 and 12 rely on successive occurrences of the synchronization pattern, for example every 125 μs. On the other hand, in order to converge faster with the boundaries of the data transmission frames, the delineation scheme and routine of FIGS. 11 and 12 may further utilize the redundant implementation of the synchronization detector discussed above. As such, the occurrence of multiple matching data patterns within the span of a data transmission frame duration may cause data to be selected as the synchronization pattern for each such occurrence. The delineation scheme and routine of FIGS. 11 and 12 may then be used to confirm which one of the matching data patterns, if any, corresponds to the synchronization pattern. The ONT/ONU may then use the data pattern that has been confirmed to be the synchronization pattern, while discarding the false positive data pattern. As a result, the ONT/ONU may converge upon the first data pattern corresponding to the synchronization pattern and align with the data transmission rather than waiting successive data transmission frame durations.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A frame delineation circuit to synchronize with a data transmission in a passive optical network, wherein the data transmission includes a plurality of data transmission frames each having a known transmission duration and a start boundary identified by a predetermined synchronization pattern, the frame delineation circuit comprising:
    a comparator to read a plurality of sets of data within the data transmission, to compare each set of data to at least part of a predetermined synchronization pattern and to output a plurality of comparison results, wherein each set of data comprises a data pattern within the data transmission;
    a boundary aligner having an input operatively coupled to an output of the comparator, the boundary aligner to assign a frame tracking signal to each one of the plurality of comparison results, wherein the frame tracking signal indicates a match between a data pattern within one of the plurality of sets of data and the predetermined synchronization pattern; and
    a frame tracker operatively coupled to an output of the boundary aligner, the frame tracker to search for the start boundary of the data transmission frames based on each frame tracking signal assigned to a comparison result, and to output a synchronization signal indicating a data pattern to select as the predetermined synchronization pattern, wherein the indicated data pattern is associated with the frame tracking signal for which a start boundary was found.

2. The circuit of claim 1, wherein the boundary aligner is coupled to an output of the frame tracker to enable a signal to select the indicated data pattern based on the synchronization signal.

3. The circuit of claim 1, further comprising a demultiplexer operatively coupled to an output of the boundary aligner, the demultiplexer to select the data from the data transmission associated with the indicated data pattern based on the signal to select the indicated data pattern.

4. The circuit of claim 1, wherein the frame tracker is configured to enable (i) a frame start signal indicating the start boundary of each data transmission frame and (ii) a synchronization state signal indicating a synchronization state associated with the frames of the data transmission, wherein the frame start signal and the synchronization state signal are enabled based on the signal to select the indicated data pattern being enabled, and wherein the frame start signal and the synchronization state signal are output in alignment with the data selected by the demultiplexer.

5. The circuit of claim 1, wherein the frame tracker comprises a plurality of state machines configured to operate in parallel, wherein each state machine is configured to each search for the start boundary of the data transmission frames based on one of a plurality of frame tracking signals assigned to a comparison result.

6. The circuit of claim 5, wherein the frame tracker is configured to output a synchronization signal indicating a data pattern to select as the predetermined synchronization pattern based on the first one of the plurality of state machines to find the start boundary of the data transmission frames.

7. The circuit of claim 6, wherein each state machine is configured to (i) enable a counter in response to one of a plurality of frame tracking signals assigned to a comparison result and (ii) increment the count for each successive predetermined synchronization pattern occurrence in intervals of the known transmission duration, and wherein the frame tracker is configured to output the synchronization signal indicating a data pattern to select as the predetermined synchronization pattern if the count reaches a predetermined threshold.

8. The circuit of claim 6, wherein each state machine is configured to:
    enter a search state to wait for one of a plurality of frame tracking signals assigned to a comparison result,
    enter a pre-synchronization state in response to one of a plurality of frame tracking signals assigned to a comparison result and search for the predetermined synchronization pattern in successive intervals of the known transmission duration, and
    enter a synchronization state in response to finding the predetermined synchronization pattern in at least one successive interval of the known transmission duration,
    wherein the frame tracker is configured to output the synchronization signal indicating a data pattern to select as the predetermined synchronization pattern if one of the plurality of state machines enters the synchronization state.

9. The circuit of claim 8, wherein each state machine is configured to enter the search state if the state machine does not find the predetermined synchronization pattern in at least one successive interval of the known transmission duration.

10. The circuit of claim 8, wherein each state machine is configured to:
    track the occurrence of the predetermined synchronization pattern in successive intervals of the known transmission duration while in the synchronization state; and
    enter the search state if the state machine does not find the predetermined synchronization pattern in at two or more successive intervals of the known transmission duration while in the synchronization state.

* * * * *